US012669327B2

(12) United States Patent
Gdor et al.

(10) Patent No.: US 12,669,327 B2
(45) Date of Patent: Jun. 30, 2026

(54) SYSTEM AND METHOD FOR SUPPRESSION OF TOOL INDUCED SHIFT IN SCANNING OVERLAY METROLOGY

(71) Applicant: KLA Corporation, Milpitas, CA (US)

(72) Inventors: Itay Gdor, Tel-Aviv (IL); Yuval Lubashevsky, Haifa (IL); Vladimir Levinski, Nazareth Ilit (IL); Daria Negri, Nesher (IL); Alon Yagil, Milpitas, CA (US); Nickolai Isakovich, Milpitas, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/099,798

(22) Filed: Jan. 20, 2023

(65) Prior Publication Data

US 2024/0167813 A1 May 23, 2024

Related U.S. Application Data

(60) Provisional application No. 63/427,538, filed on Nov. 23, 2022.

(51) Int. Cl.
G01B 11/27 (2006.01)
G01N 21/47 (2006.01)
G01N 21/956 (2006.01)

(52) U.S. Cl.
CPC ....... G01B 11/272 (2013.01); G01N 21/4788 (2013.01); G01N 21/956 (2013.01); G01B 2210/56 (2013.01)

(58) Field of Classification Search
CPC .............. G01B 11/272; G01B 2210/56; G01N 21/4788; G01N 21/956
See application file for complete search history.

(56) References Cited

U.S. PATENT DOCUMENTS

| 4,947,413 A | 8/1990 | Jewell et al. |
| 5,216,257 A | 6/1993 | Brueck et al. |
| (Continued) | | |

FOREIGN PATENT DOCUMENTS

| CN | 104346808 A | 2/2015 |
| CN | 111766764 A | 10/2020 |
| (Continued) | | |

OTHER PUBLICATIONS

Korean Intellectual Property Office, International Search Report and Written Opinion received in International Application No. PCT/US2023/036069, Feb. 20, 2024, 8 pages.

(Continued)

*Primary Examiner* — Michelle M Iacoletti
*Assistant Examiner* — Jarreas Underwood
(74) *Attorney, Agent, or Firm* — Suiter Swantz IP

(57) ABSTRACT

An overlay metrology system and method are disclosed for generating an overlay measurement of an overlay target including cells with structures in reversed orders. The overlay metrology system may include an illumination subsystem and a collection sub-system. The collection sub-system may include one or more detectors to collect measurement light from a sample. The sample, according to a metrology recipe, may include an overlay target having a first cell of a first cell type and a second cell of a second cell type, where the second cell type includes structures in a reverse order relative to the first cell type. The metrology recipe may include receiving detection signals, generating an overlay measurement of each cell based on the detection signals, and generating an overlay measurement associated with the overlay target based on a value indicative of an average of the overlay measurements of each cell.

31 Claims, 12 Drawing Sheets

(56) References Cited

U.S. PATENT DOCUMENTS

| 5,414,514 | A | | 5/1995 | Smith et al. |
|---|---|---|---|---|
| 5,563,702 | A | * | 10/1996 | Emery ............. G01N 21/95607 |
| | | | | 356/73 |
| 5,808,731 | A | | 9/1998 | Kirk |
| 5,822,055 | A | * | 10/1998 | Tsai ................. G01N 21/95607 |
| | | | | 250/559.46 |
| 5,895,735 | A | | 4/1999 | Yoon |
| 5,914,204 | A | | 6/1999 | Lee |
| 6,958,819 | B1 | | 10/2005 | Heaton et al. |
| 6,982,793 | B1 | | 1/2006 | Yang et al. |
| 7,046,361 | B1 | * | 5/2006 | Yang .................... G03F 7/70633 |
| | | | | 356/401 |
| 7,247,843 | B1 | | 7/2007 | Moon |
| 7,254,792 | B1 | * | 8/2007 | Rekhi ...................... G06F 30/39 |
| | | | | 716/115 |
| 7,440,105 | B2 | | 10/2008 | Adel et al. |
| 7,528,941 | B2 | * | 5/2009 | Kandel ............... G03F 7/70633 |
| | | | | 356/600 |
| 7,602,491 | B2 | | 10/2009 | Kandel et al. |
| 7,671,990 | B1 | | 3/2010 | Adel et al. |
| 8,520,212 | B2 | * | 8/2013 | Coene .................... G01N 21/55 |
| | | | | 356/445 |
| 8,786,825 | B2 | | 7/2014 | Kerkhof et al. |
| 9,123,649 | B1 | | 9/2015 | Manassen et al. |
| 9,739,702 | B2 | * | 8/2017 | Bringoltz ............. G01B 11/272 |
| 9,864,209 | B2 | * | 1/2018 | Levinski ............. G03F 7/70616 |
| 9,885,961 | B1 | | 2/2018 | Amir |
| 9,929,104 | B2 | | 3/2018 | Park et al. |
| 10,197,389 | B2 | | 2/2019 | Levinski et al. |
| 10,268,125 | B2 | | 4/2019 | Peng et al. |
| 10,437,163 | B2 | | 10/2019 | Schaar et al. |
| 10,488,768 | B2 | | 11/2019 | Auer et al. |
| 10,527,952 | B2 | | 1/2020 | Grunzweig et al. |
| 10,551,749 | B2 | | 2/2020 | Levinski et al. |
| 10,571,811 | B2 | | 2/2020 | Amit et al. |
| 10,585,357 | B2 | | 3/2020 | Schaar et al. |
| 10,606,178 | B2 | | 3/2020 | Zwier |
| 10,691,030 | B2 | | 6/2020 | Staals et al. |
| 10,802,409 | B2 | | 10/2020 | Fan et al. |
| 10,824,079 | B2 | | 11/2020 | Lubashevsky et al. |
| 10,983,005 | B2 | | 4/2021 | Wu et al. |
| 11,073,768 | B2 | | 7/2021 | Hill et al. |
| 11,085,754 | B2 | | 8/2021 | Amit et al. |
| 11,112,369 | B2 | | 9/2021 | Gready |
| 11,119,417 | B2 | | 9/2021 | Manassen et al. |
| 11,164,307 | B1 | | 11/2021 | Feler et al. |
| 11,248,905 | B2 | | 2/2022 | Amit et al. |
| 11,300,405 | B2 | | 4/2022 | Manassen et al. |
| 11,300,524 | B1 | | 4/2022 | Hill et al. |
| 11,353,799 | B1 | | 6/2022 | Volkovich et al. |
| 11,355,375 | B2 | | 6/2022 | Volkovich et al. |
| 11,378,394 | B1 | | 7/2022 | Paskover et al. |
| 11,428,642 | B2 | | 8/2022 | Hill et al. |
| 11,526,086 | B2 | | 12/2022 | Hill et al. |
| 11,531,275 | B1 | | 12/2022 | Hill et al. |
| 11,604,149 | B2 | | 3/2023 | Feler |
| 11,640,116 | B2 | | 5/2023 | Den Boef et al. |
| 11,796,925 | B2 | | 10/2023 | Lubashevsky et al. |
| 12,105,433 | B2 | | 10/2024 | Feler et al. |
| 12,216,412 | B2 | | 2/2025 | Hsieh et al. |
| 12,235,588 | B2 | | 2/2025 | Manassen et al. |
| 2001/0021477 | A1 | | 9/2001 | Dirksen et al. |
| 2002/0033952 | A1 | * | 3/2002 | Hill ........................ G01Q 70/06 |
| | | | | 356/512 |
| 2002/0080364 | A1 | | 6/2002 | Monshouwer et al. |
| 2004/0101983 | A1 | | 5/2004 | Jones et al. |
| 2004/0133369 | A1 | * | 7/2004 | Pack .......................... G03F 1/84 |
| | | | | 716/52 |
| 2004/0169861 | A1 | | 9/2004 | Mieher et al. |
| 2005/0012928 | A1 | | 1/2005 | Sezginer et al. |
| 2005/0195398 | A1 | | 9/2005 | Adel et al. |
| 2006/0117293 | A1 | | 6/2006 | Smith et al. |
| 2007/0077503 | A1 | | 4/2007 | Yoo |
| 2007/0234786 | A1 | | 10/2007 | Moon |
| 2007/0242272 | A1 | | 10/2007 | Suehira et al. |
| 2007/0279630 | A1 | | 12/2007 | Kandel et al. |
| 2009/0042108 | A1 | | 2/2009 | Yasuzato |
| 2009/0195768 | A1 | * | 8/2009 | Bijnen ................... G03B 27/32 |
| | | | | 355/77 |
| 2010/0123886 | A1 | * | 5/2010 | Bijnen ................. G03F 9/7084 |
| | | | | 355/53 |
| 2010/0267682 | A1 | | 10/2010 | Johri et al. |
| 2010/0277706 | A1 | | 11/2010 | Schaar et al. |
| 2011/0122496 | A1 | | 5/2011 | Schaar et al. |
| 2012/0033193 | A1 | | 2/2012 | Schaar et al. |
| 2012/0069337 | A1 | * | 3/2012 | Ishigo ................... G03F 9/7046 |
| | | | | 356/401 |
| 2012/0253325 | A1 | | 10/2012 | Sniffin et al. |
| 2013/0032712 | A1 | | 2/2013 | Shih et al. |
| 2013/0193602 | A1 | | 8/2013 | Suzuki et al. |
| 2013/0252429 | A1 | | 9/2013 | Okamoto et al. |
| 2014/0065736 | A1 | | 3/2014 | Amir et al. |
| 2014/0240704 | A1 | | 8/2014 | Komine et al. |
| 2015/0138523 | A1 | | 5/2015 | Jak et al. |
| 2015/0177135 | A1 | | 6/2015 | Amit et al. |
| 2015/0204664 | A1 | | 7/2015 | Bringoltz et al. |
| 2015/0235880 | A1 | | 8/2015 | Inada et al. |
| 2015/0292877 | A1 | | 10/2015 | Marciano et al. |
| 2015/0293458 | A1 | | 10/2015 | Vanoppen et al. |
| 2015/0308817 | A1 | | 10/2015 | Li et al. |
| 2016/0047744 | A1 | * | 2/2016 | Adel .................... G03F 7/70633 |
| | | | | 356/243.1 |
| 2016/0061589 | A1 | | 3/2016 | Bhattacharyya et al. |
| 2016/0071260 | A1 | * | 3/2016 | Azordegan ............ G01B 11/24 |
| | | | | 716/123 |
| 2016/0093574 | A1 | | 3/2016 | Cai et al. |
| 2016/0123894 | A1 | * | 5/2016 | Fu ...................... G01B 11/0616 |
| | | | | 356/615 |
| 2016/0146740 | A1 | | 5/2016 | Lu et al. |
| 2016/0223920 | A1 | | 8/2016 | Tinnemans et al. |
| 2016/0300767 | A1 | | 10/2016 | Ko et al. |
| 2016/0334716 | A1 | * | 11/2016 | Mieher ............... G03F 7/70683 |
| 2017/0146338 | A1 | | 5/2017 | Allen |
| 2017/0307367 | A1 | | 10/2017 | Yaegashi et al. |
| 2017/0351184 | A1 | | 12/2017 | Peng et al. |
| 2018/0024054 | A1 | | 1/2018 | Moon et al. |
| 2018/0090296 | A1 | * | 3/2018 | Neil ......................... H01J 37/20 |
| 2018/0094978 | A1 | * | 4/2018 | Neil ........................ G01J 3/2803 |
| 2018/0188663 | A1 | | 7/2018 | Levinski et al. |
| 2018/0246420 | A1 | | 8/2018 | Pandey et al. |
| 2018/0373167 | A1 | * | 12/2018 | Grunzweig ......... G03F 7/70683 |
| 2019/0004439 | A1 | | 1/2019 | Lubashevsky et al. |
| 2019/0033726 | A1 | * | 1/2019 | Adam ................. G03F 7/70633 |
| 2019/0049373 | A1 | | 2/2019 | Levinski |
| 2019/0101835 | A1 | | 4/2019 | Chen |
| 2019/0219931 | A1 | | 7/2019 | Zwier |
| 2019/0279841 | A1 | * | 9/2019 | Xiao ........................ H01J 37/28 |
| 2019/0285996 | A1 | | 9/2019 | Shibayama et al. |
| 2019/0310080 | A1 | * | 10/2019 | Hill ........................ G03F 9/7034 |
| 2019/0317413 | A1 | * | 10/2019 | Cheng ................. G03F 7/70633 |
| 2019/0354024 | A1 | | 11/2019 | Tsiatmas et al. |
| 2019/0378012 | A1 | * | 12/2019 | Tripodi .................... G06N 3/08 |
| 2020/0050114 | A1 | | 2/2020 | Bozkurt et al. |
| 2020/0132446 | A1 | | 4/2020 | Shalibo et al. |
| 2020/0233317 | A1 | | 7/2020 | Ausschnitt et al. |
| 2020/0241429 | A1 | | 7/2020 | Yang et al. |
| 2020/0409271 | A1 | * | 12/2020 | Hill .................... G03F 7/70641 |
| 2021/0072650 | A1 | * | 3/2021 | Feler ........................ G06T 7/68 |
| 2021/0233821 | A1 | | 7/2021 | Feler et al. |
| 2021/0364279 | A1 | | 11/2021 | Manassen et al. |
| 2021/0364935 | A1 | | 11/2021 | Gdor et al. |
| 2022/0034652 | A1 | | 2/2022 | Manassen et al. |
| 2022/0252990 | A1 | | 8/2022 | Javaheri et al. |
| 2022/0328365 | A1 | | 10/2022 | Manassen et al. |
| 2023/0064193 | A1 | | 3/2023 | Tinnemans et al. |
| 2023/0133640 | A1 | | 5/2023 | Hill et al. |
| 2023/0213875 | A1 | | 7/2023 | Lubashevsky et al. |
| 2023/0314319 | A1 | | 10/2023 | Manassen et al. |
| 2023/0314344 | A1 | | 10/2023 | Paskover et al. |
| 2024/0004310 | A1 | | 1/2024 | Blanton et al. |
| 2024/0142883 | A1 | | 5/2024 | Reddy et al. |
| 2024/0167813 | A1 | | 5/2024 | Gdor et al. |

(56)          References Cited

U.S. PATENT DOCUMENTS

FOREIGN PATENT DOCUMENTS

| EP | 0532927 A2 * | 3/1993 | |
|----|----|----|----|
| JP | 214765 Y1 | 8/1998 | |
| JP | 10214765 A | 11/1998 | |
| JP | 2001093820 A | 4/2001 | |
| JP | 2002134394 A | 5/2002 | |
| JP | 2007140460 | 2/2009 | |
| JP | 2010267682 A | 11/2010 | |
| JP | 2011243664 A | 12/2011 | |
| JP | 2012253325 A | 12/2012 | |
| JP | 2013074258 A | 4/2013 | |
| JP | 2013254780 | 7/2015 | |
| JP | 2015154008 A | 8/2015 | |
| KR | 101185992 B1 | 9/2012 | |
| KR | 20150121275 A | 10/2015 | |
| KR | 1020160121206 A | 10/2016 | |
| WO | WO-2017125352 A1 * | 7/2017 | ........... G01B 9/0201 |
| WO | WO-2021012792 A1 * | 2/2021 | ........... G03F 9/7046 |
| WO | WO-2021023792 A1 * | 2/2021 | ........... G03F 9/7046 |
| WO | 2023035658 A1 | 3/2023 | |
| WO | 2025153300 A1 | 7/2025 | |

OTHER PUBLICATIONS

U.S. Appl. No. 18/110,746, filed Feb. 16, 2023, Amnon Manassen.

U.S. Appl. No. 18/230,542, filed Aug. 4, 2023, Jordan Pio.

U.S. Appl. No. 18/234,773, filed Aug. 16, 2023, Yuval Lubashevsky.

U.S. Appl. No. 18/372,444, filed Sep. 25, 2023, Itay Gdor.

U.S. Appl. No. 18/372,531, filed Sep. 25, 2023, Itay Gdor.

Buttgereit, et al., "Phame(R)—high resolution off-axis phase shift measurements on 45nm node features," 24th European Mask and Lithography Conference, 2008, pp. 1-7, doi: 10.1117/12.798805.

Di, et al., "Moiré-Based Absolute Interferometry With Large Measurement Range in Wafer-Mask Alignment", IEEE Photonics Technology Letters, vol. 27, No. 4, pp. 435-438, 2015. doi: 10.1109/LPT.2014.2377037.

Fesperman Jr., Ronnie Rex, (2006). Multiscale Alignment and Positioning System. (UMI 3264369) [Doctor of Philosophy, University of North Carolina] ProQuest Information and Learning Company.

International Search Report and Written Report in International Application No. PCT/US2021/061296 dated Mar. 24, 2022, 9 pages.

Kikuchi et al., "Principle and observation of fluorescence moire fringes for alignment in print and imprint methods" J. Vac. Sci. Technol. B 35, 06G303 (2017); https://doi.org/10.1116/1.4990844, Submitted: Jun. 19, 2017 . Accepted: Aug. 31, 2017 . Published Online: Sep. 26, 2017.

Korean Intellectual Property Office, International Search Report and Written Opinion for International Application No. PCT/US2022/052061, Apr. 24, 2023, 10 pages.

Korean Intellectual Property Office, International Search Report and Written Opinion for International Application No. PCT/US2023/013654, Jun. 8, 2023, 12 pages.

Korean Intellectual Property Office, International Search Report and Written Opinion for International Application No. PCT/US2023/014005, Jun. 16, 2023, 8 pages.

Moon, et al., "Immunity to Signal Degradation by Overlayers Using a Novel Spatial-Phase-Matching Alignment System", J. Vac. Sci. Technol. B 13, 2648-2652 (1995).

PCT International Search Report and Written Opinion for International Application No. PCT/US2021/044111 dated Nov. 22, 2022, 9 pages.

Servin, et al., "Mask contribution on CD & OVL errors budgets for Double Patterning Lithography," 25th European Mask and Lithography Conference, 2009, pp. 1-13.

Wu, et al., (2012). Nanoimprint lithography with ≤60 nm overlay precision. Applied Physics A, 106, 767-772.

Zhou, et al., "Fourier-based analysis of moire fringe patterns of superposed gratings in alignment of nanolithography", Optics Express, vol. 16, No. 11, p. 7869, 2008. doi: 10.1364/OE.16.007869.

Zhu et al. Four-quadrant gratings moire fringe alignment measurement in proximity lithography. Optics Express. Feb. 2013;21(3):3463-3473. DOI: 10.1364/OE.21.003463. PMID: 23481804.

Zhu, et al., (2015). Adjustment Strategy for Inclination Moire Fringes in Lithography by Spatial Frequency Decomposition. IEEE Photonics Technology Letters. 27. 395-398. 10.1109/LPT.2014.2370072.

Adel et al., "Diffraction order control in overlay metrology: a review of the roadmap options," Proc. SPIE. 6922, Metrology, Inspection, and Process Control for Microlithography XXII, pp. 692202-1 to 692202-19, Apr. 2008.

Zhou et al., "Moiré-Based Interferometry for Magnification Calibration of Bitelecentric Lens System," IEEE Photonics Journal, vol. 7, No. 6, Dec. 2015, 12 pages.

Korean Intellectual Property Office, International Search Report and International Application No. PCT/US2024/018577, Jul. 2, 2024, 9 pages.

* cited by examiner

700

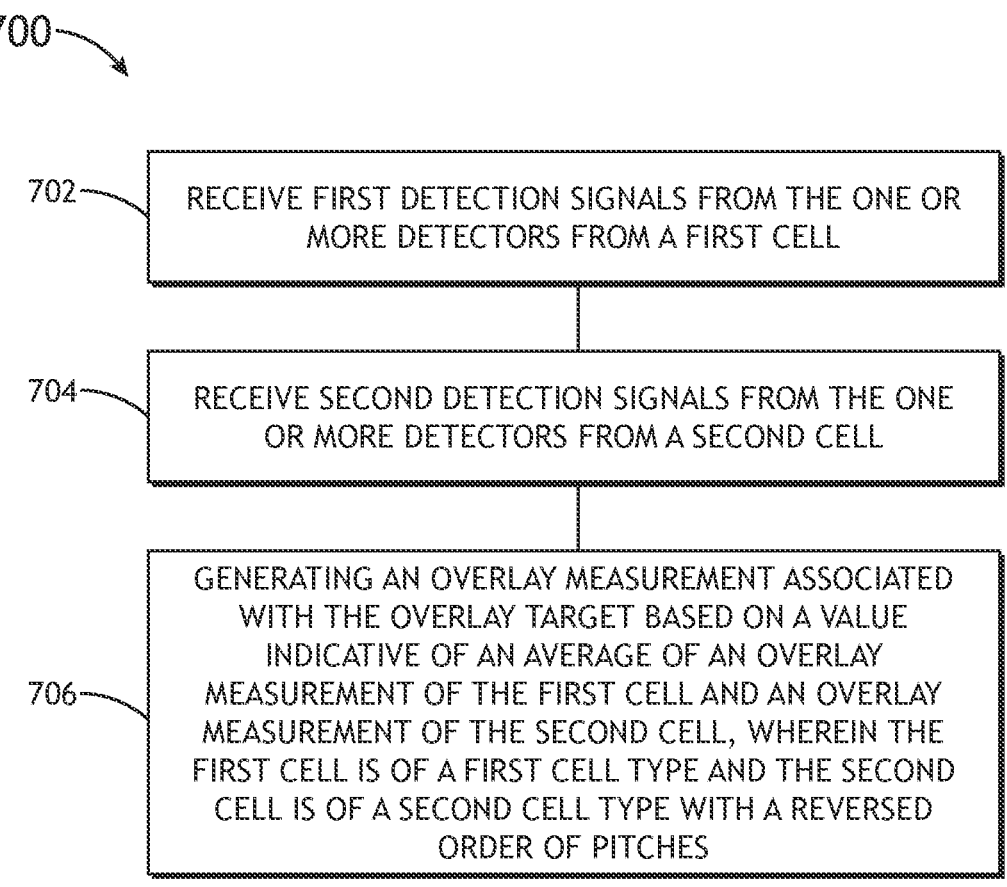

702 — RECEIVE FIRST DETECTION SIGNALS FROM THE ONE OR MORE DETECTORS FROM A FIRST CELL

704 — RECEIVE SECOND DETECTION SIGNALS FROM THE ONE OR MORE DETECTORS FROM A SECOND CELL

706 — GENERATING AN OVERLAY MEASUREMENT ASSOCIATED WITH THE OVERLAY TARGET BASED ON A VALUE INDICATIVE OF AN AVERAGE OF AN OVERLAY MEASUREMENT OF THE FIRST CELL AND AN OVERLAY MEASUREMENT OF THE SECOND CELL, WHEREIN THE FIRST CELL IS OF A FIRST CELL TYPE AND THE SECOND CELL IS OF A SECOND CELL TYPE WITH A REVERSED ORDER OF PITCHES

FIG.7

SYSTEM AND METHOD FOR SUPPRESSION OF TOOL INDUCED SHIFT IN SCANNING OVERLAY METROLOGY

CROSS-REFERENCE TO RELATED APPLICATION

The present application claims the benefit under 35 U.S.C. § 119(e) of U.S. Provisional Application Ser. No. 63/427,538, filed Nov. 23, 2022, entitled STEM AND METHOD FOR SUPPRESSION OF TOOL INDUCED SHIFT IN SCANNING OVERLAY METROLOGY, naming Itay Gdor, Yuval Lubashevsky, Vladimir Levinski, Daria Negri, Alon Yagil, and Nickolai Isakovich, which is incorporated herein by reference in the entirety.

TECHNICAL FIELD

The present invention generally relates to overlay metrology and, more particularly, to a system and method for overlay metrology for reducing tool induced shift error in overlay measurements of overlay targets.

BACKGROUND

Demands to decrease feature size and increase feature density results in increased demand for accurate and efficient overlay metrology. Overlay metrology refers to measurements of the relative alignment of layers on a sample such as, but not limited to, semiconductor devices.

Overlay targets are typically formed on the surface of a sample and may include cells with grating structures having various pitches in overlapping layers. A sample is typically mounted on a translation stage and translated such that the overlay targets are sequentially moved into a measurement field of view. In typical metrology systems employing a move and measure (MAM) approach, the sample is static during each measurement. However, the time required for the translation stage to settle prior to a measurement may negatively impact the throughput.

Further, various sources may introduce errors into the overlay metrology data, such as tool induced shift (TIS) errors. For example, illumination non-uniformity may cause TIS errors. For instance, contaminates such as particles or dust may deposit on the filters and cause non-homogeneous distributions in the illumination beam. In another example, the illumination beam may not be properly aligned with the sample during the measurement, further contributing to TIS error.

Therefore, it is desirable to provide systems and methods for curing the above deficiencies.

SUMMARY

An overlay metrology system is disclosed in accordance with one or more illustrative embodiments of the present disclosure. In one illustrative embodiment, the overlay metrology system includes a controller. In another illustrative embodiment, the controller may include one or more processors configured to execute program instructions causing the one or more processors to execute a metrology recipe. In another illustrative embodiment, the metrology recipe may include receiving detection signals from the one or more detectors from each cell, generating an overlay measurement of each cell based on the detection signals, and generating an overlay measurement associated with the overlay target based on a value indicative of an average of the overlay measurements of each cell. In another illustrative embodiment, the sample, according to a metrology recipe, may include an overlay target having a first cell of a first cell type and a second cell of a second cell type, where the second cell type includes structures in a reverse order relative to the first cell type.

An overlay metrology system is disclosed in accordance with one or more illustrative embodiments of the present disclosure. In one illustrative embodiment, the overlay metrology system includes an illumination sub-system and a collection sub-system. The collection sub-system may include one or more detectors to collect measurement light from a sample. The sample, according to a metrology recipe, may include an overlay target having a first cell of a first cell type and a second cell of a second cell type, where the second cell type includes structures in a reverse order relative to the first cell type. The metrology recipe may include receiving detection signals from the one or more detectors from each cell, generating an overlay measurement of each cell based on the detection signals, and generating an overlay measurement associated with the overlay target based on a value indicative of an average of the overlay measurements of each cell.

An overlay target is disclosed in accordance with one or more illustrative embodiments of the present disclosure. In one illustrative embodiment, the overlay target includes at least four cells, including a first cell and a second cell. The first cell may include a first layer and a second layer of structures having a first pitch and a second pitch, respectively. The layers may be in a first order along the depth direction of the sample. The second cell may include layers of structures having the first pitch and the second pitch in a reversed order relative to the first order. The first cell type and the second cell type may both include a first pitch and a second pitch, but the order of the pitches may be reversed relative to each other.

A method is disclosed for generating an overlay measurement associated with an overlay target. The method includes receiving first and second detection signals from one or more detectors from a first and second cell of the two or more cells of the overlay target. The first and second cells are defined as first and second cell types characterized by orders of structures in layers, the orders characterized by pitches of the structures in the layers, An overlay measurement of the first cell is generated based on the first detection signals, and an overlay measurement of the second cell is generated based on the second detection signals. The first and second cell types both include a first pitch and a second pitch, but the first pitch and the second pitch of the first cell type are in a reversed order relative to the first pitch and the second pitch in the second cell type as defined relative to a depth direction of the sample. An overlay measurement associated with the overlay target is generated based on a value indicative of an average of the overlay measurement of the first cell and the overlay measurement of the second cell.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

3

Figure 1A:
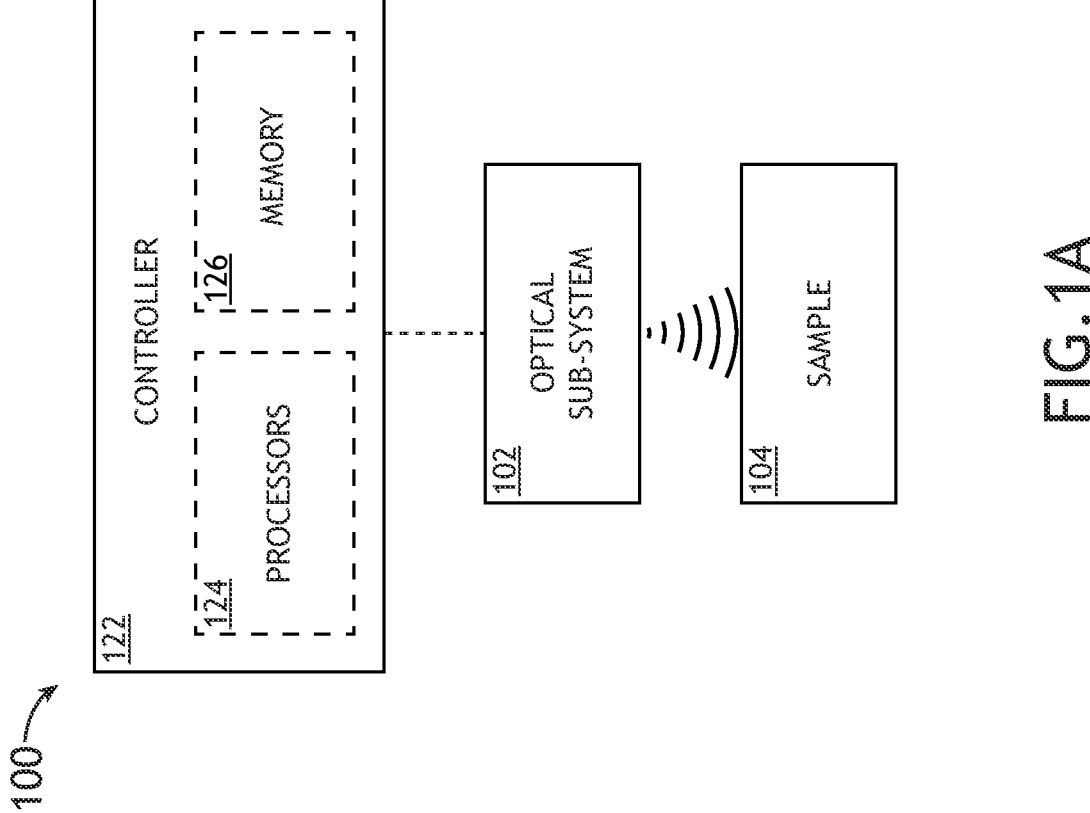

FIG. 1A is a conceptual view of an overlay metrology system, in accordance with one or more embodiments of the present disclosure.

Figure 1B:
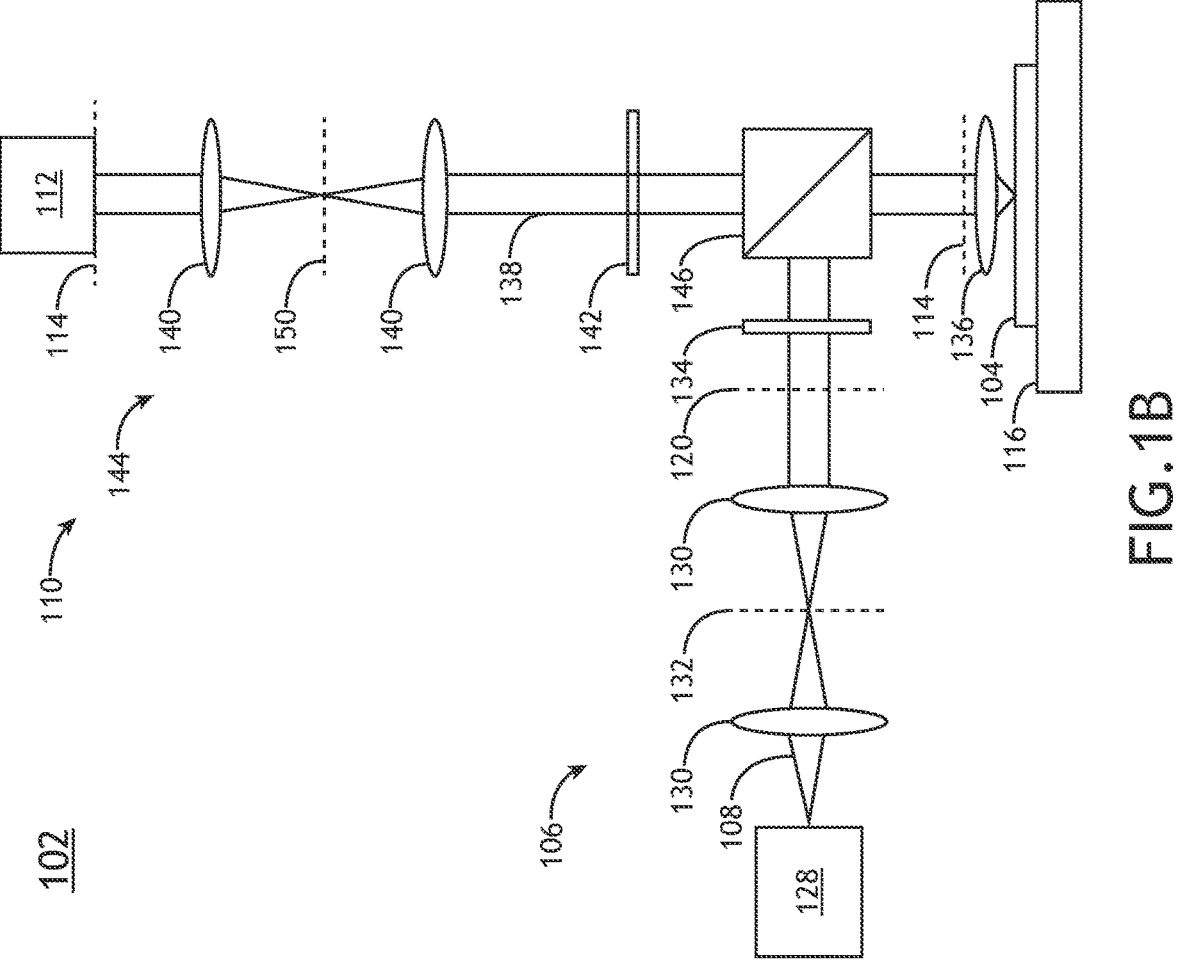

FIG. 1B is a schematic view of the optical sub-system, in accordance with one or more embodiments of the present disclosure.

Figure 2B:
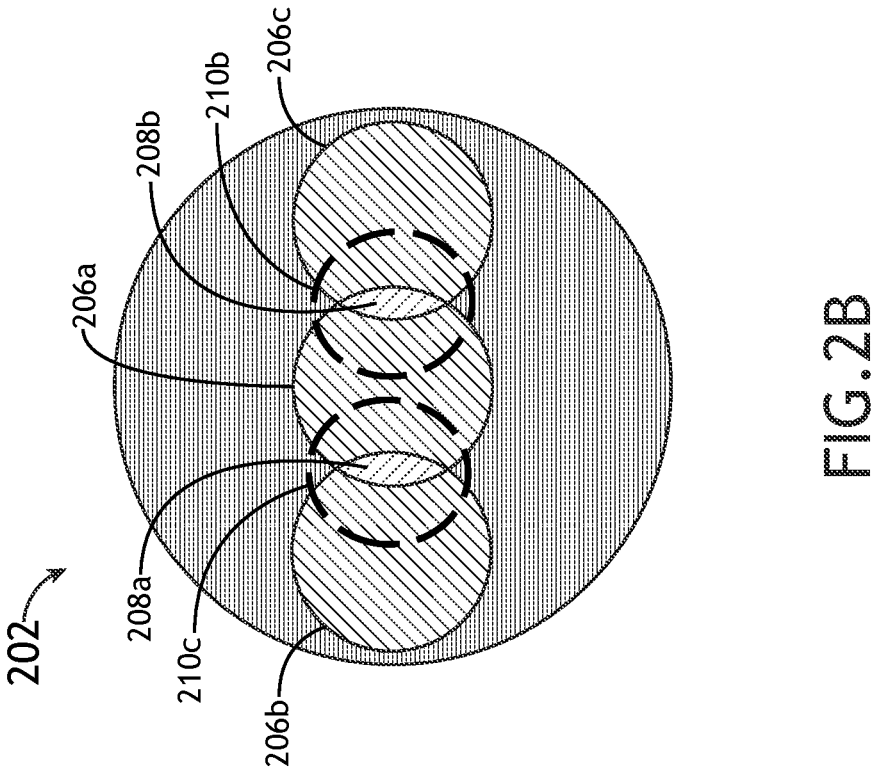
Figure 2A:
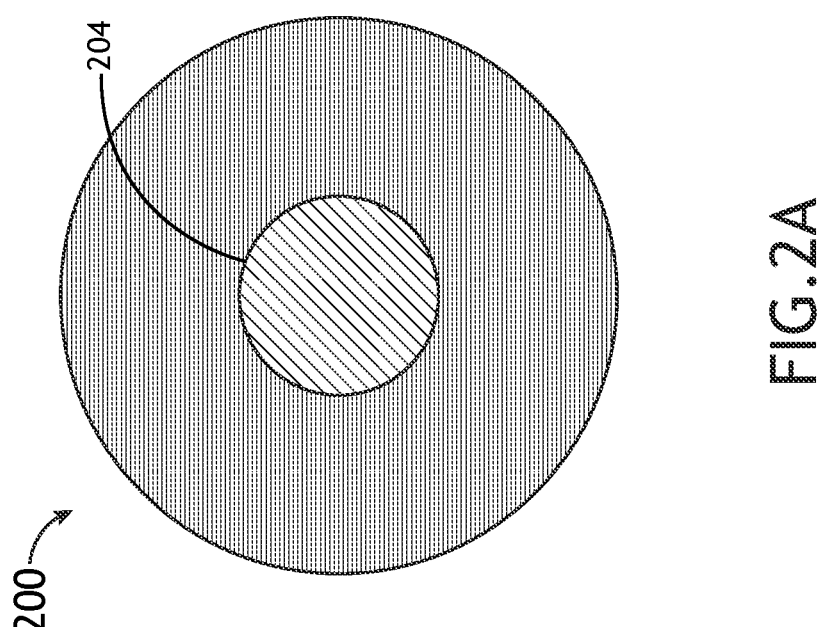

FIG. 2A is a conceptual view of an illumination pupil plane distribution of a circular illumination beam, in accordance with one or more embodiments of the present disclosure.

FIG. 2B is a conceptual view of a collection pupil plane distribution of diffraction orders of the circular illumination beam of FIG. 2A, in accordance with one or more embodiments of the present disclosure.

Figure 3:
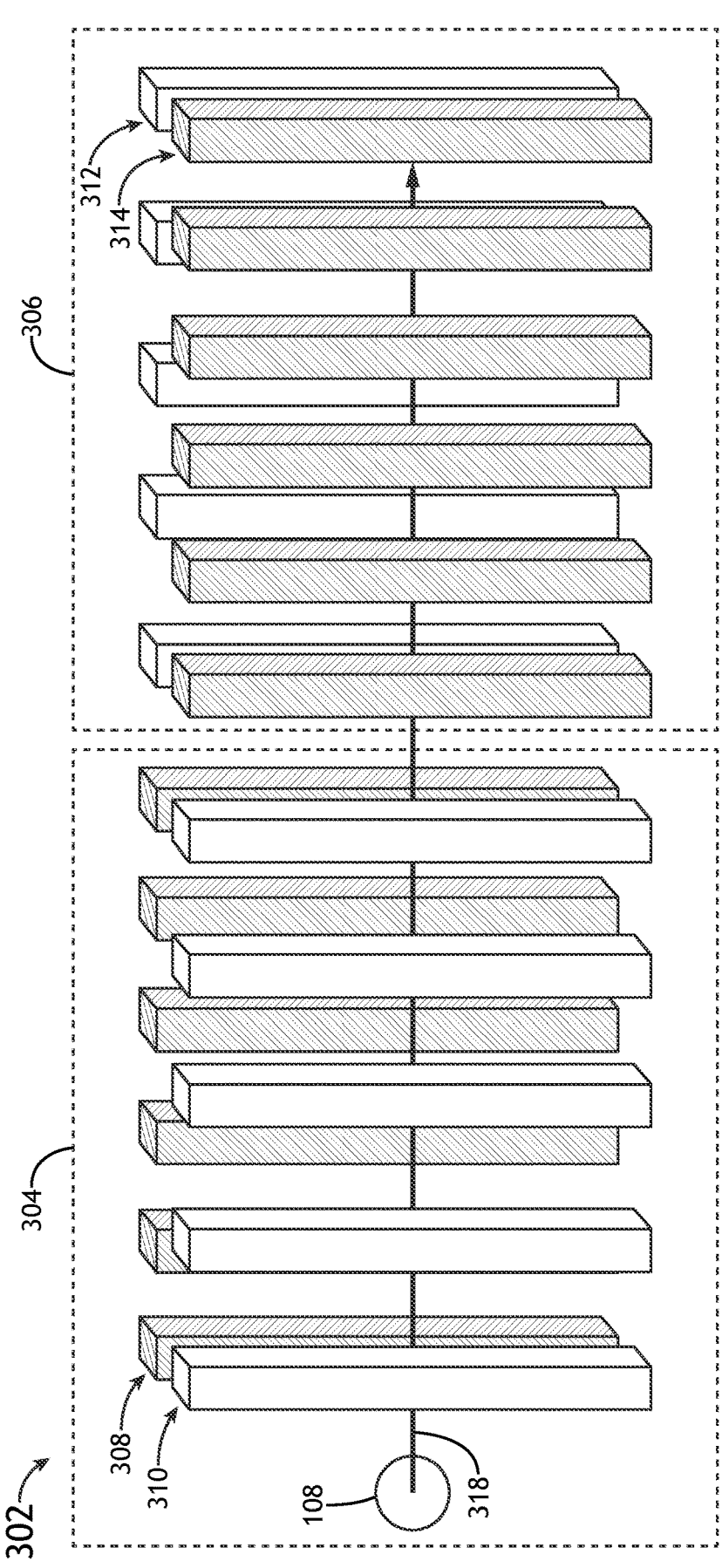

FIG. 3 is a schematic view of an overlay target, in accordance with one or more embodiments of the present disclosure.

Figure 4:
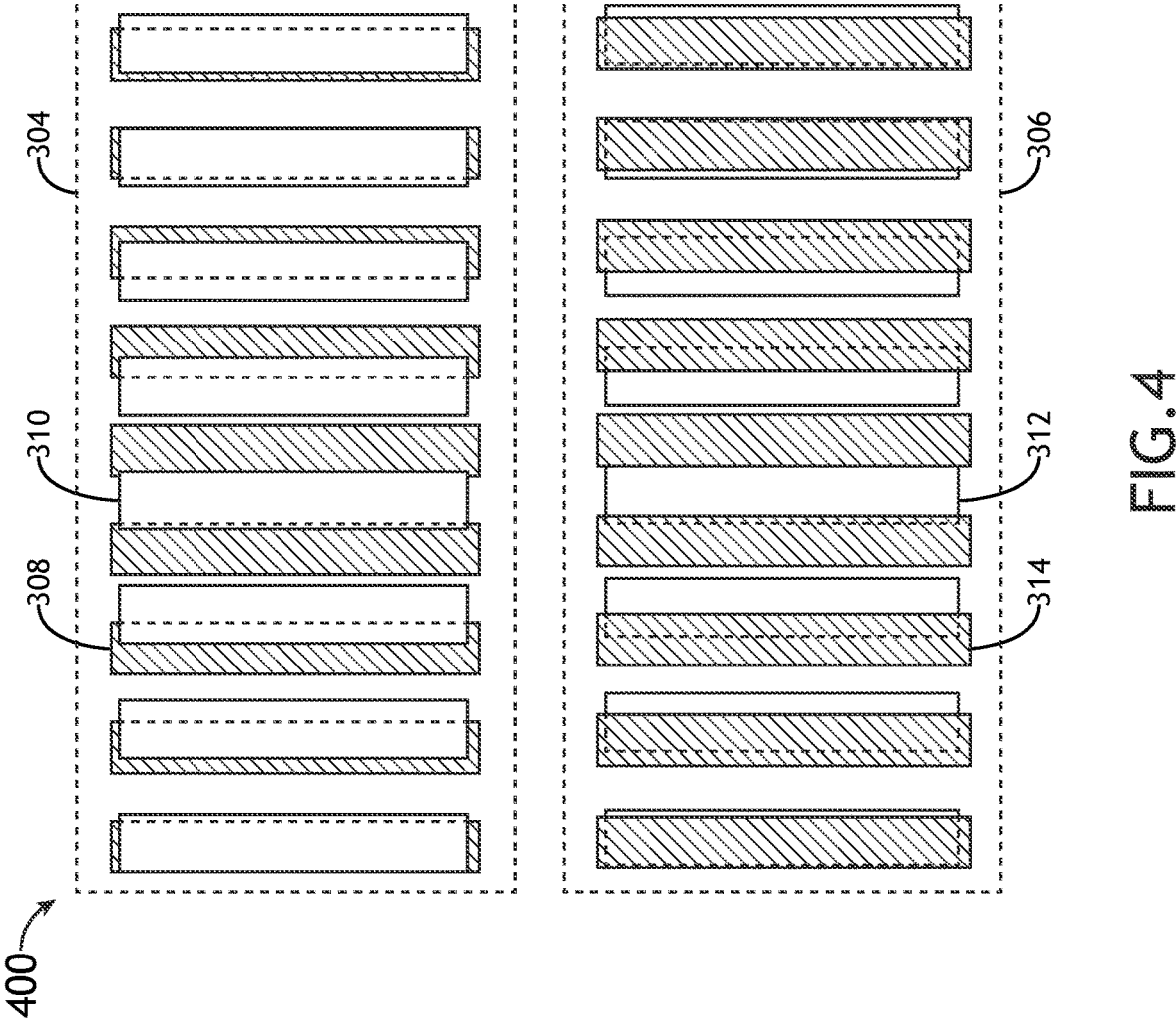

FIG. 4 is a top view of an overlay target, in accordance with one or more embodiments of the present disclosure.

Figure 5:
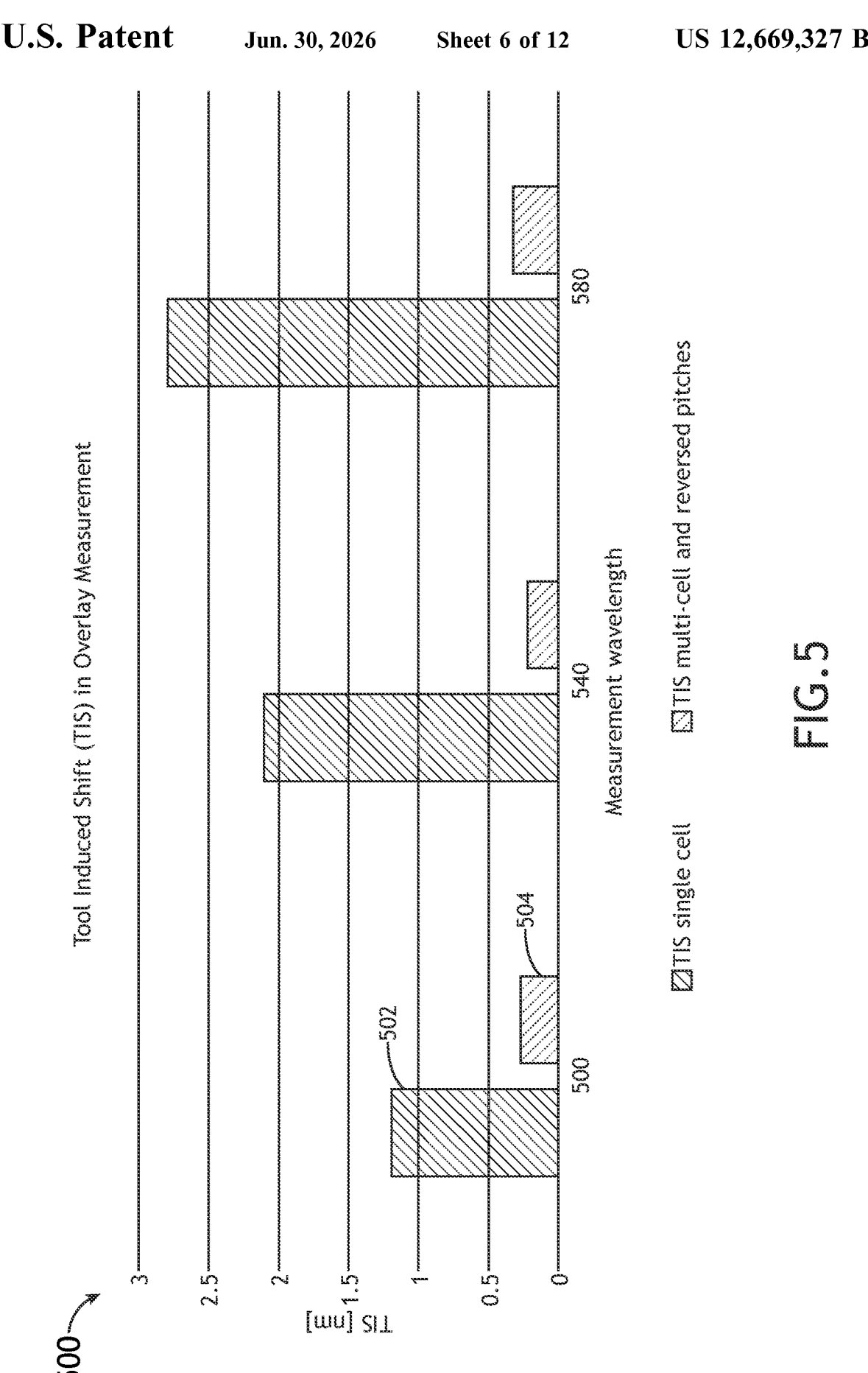

FIG. 5 is a data graph depicting TIS error for various wavelengths for single cell targets and multi-cell reversed pitch targets, in accordance with one or more embodiments of the present disclosure.

Figure 6A:
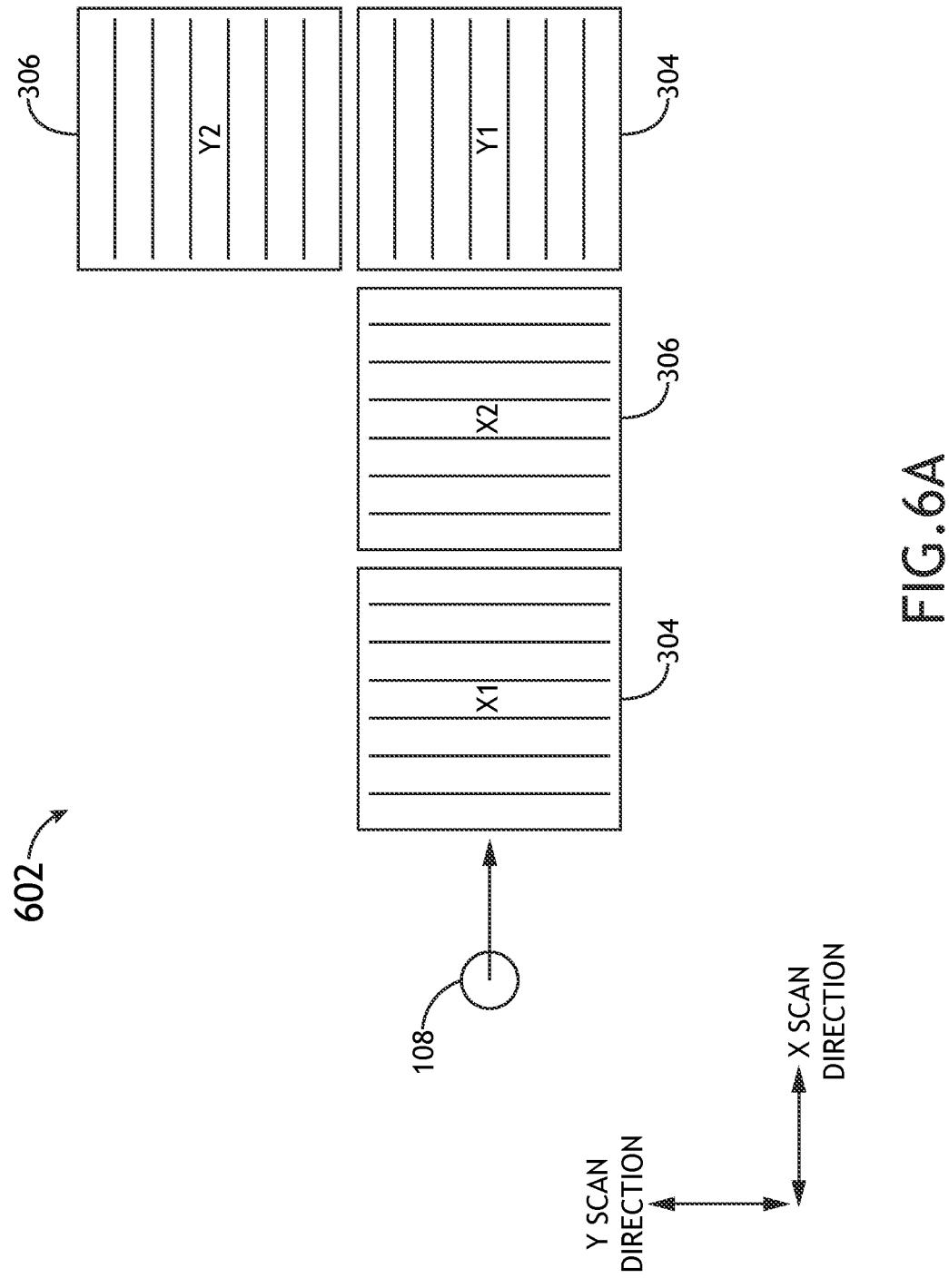

FIG. 6A is a top view of an overlay target, in accordance with one or more embodiments of the present disclosure.

Figure 6B:
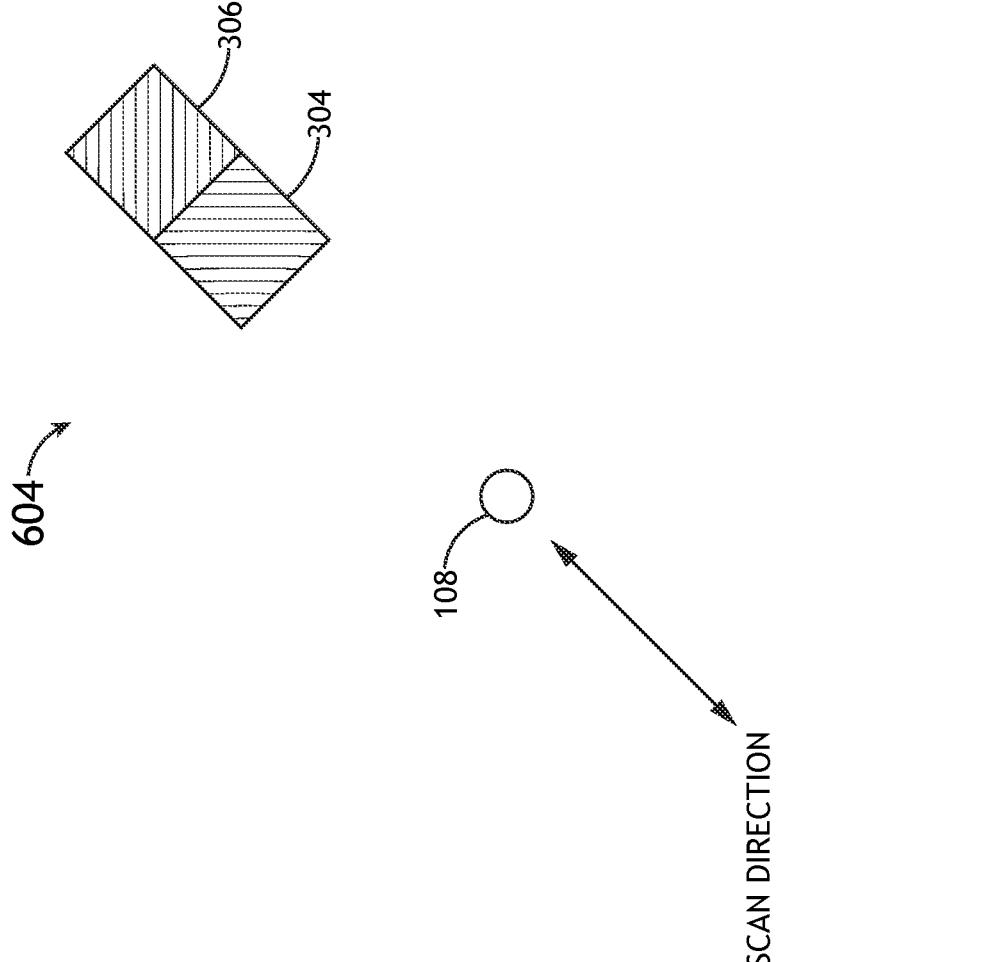

FIG. 6B is a top view of an overlay target, in accordance with one or more embodiments of the present disclosure.

Figure 6C:
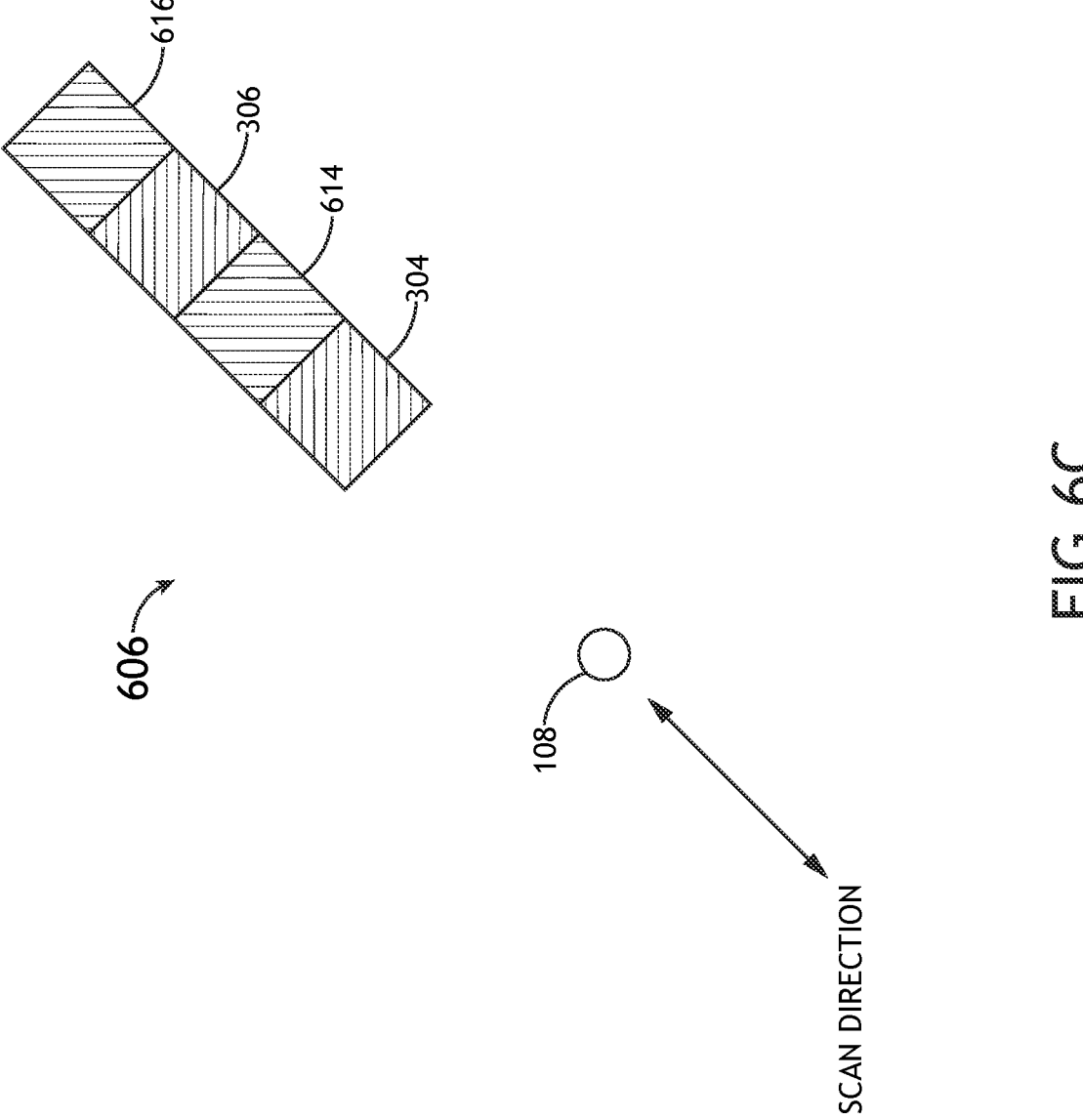

FIG. 6C is a top view of an overlay target, in accordance with one or more embodiments of the present disclosure.

Figure 6D:
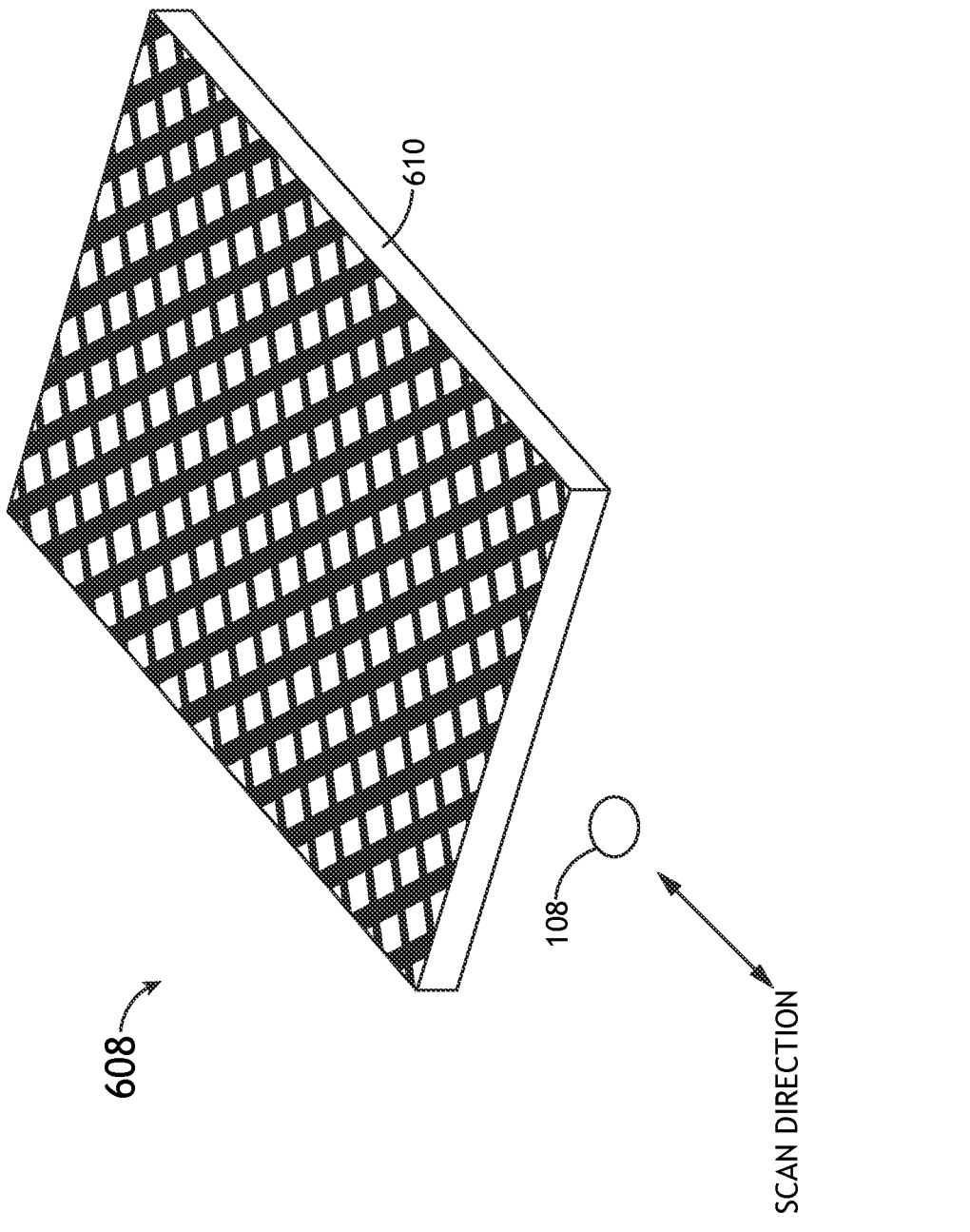

FIG. 6D is a schematic view of an overlay target, in accordance with one or more embodiments of the present disclosure.

Figure 6E:
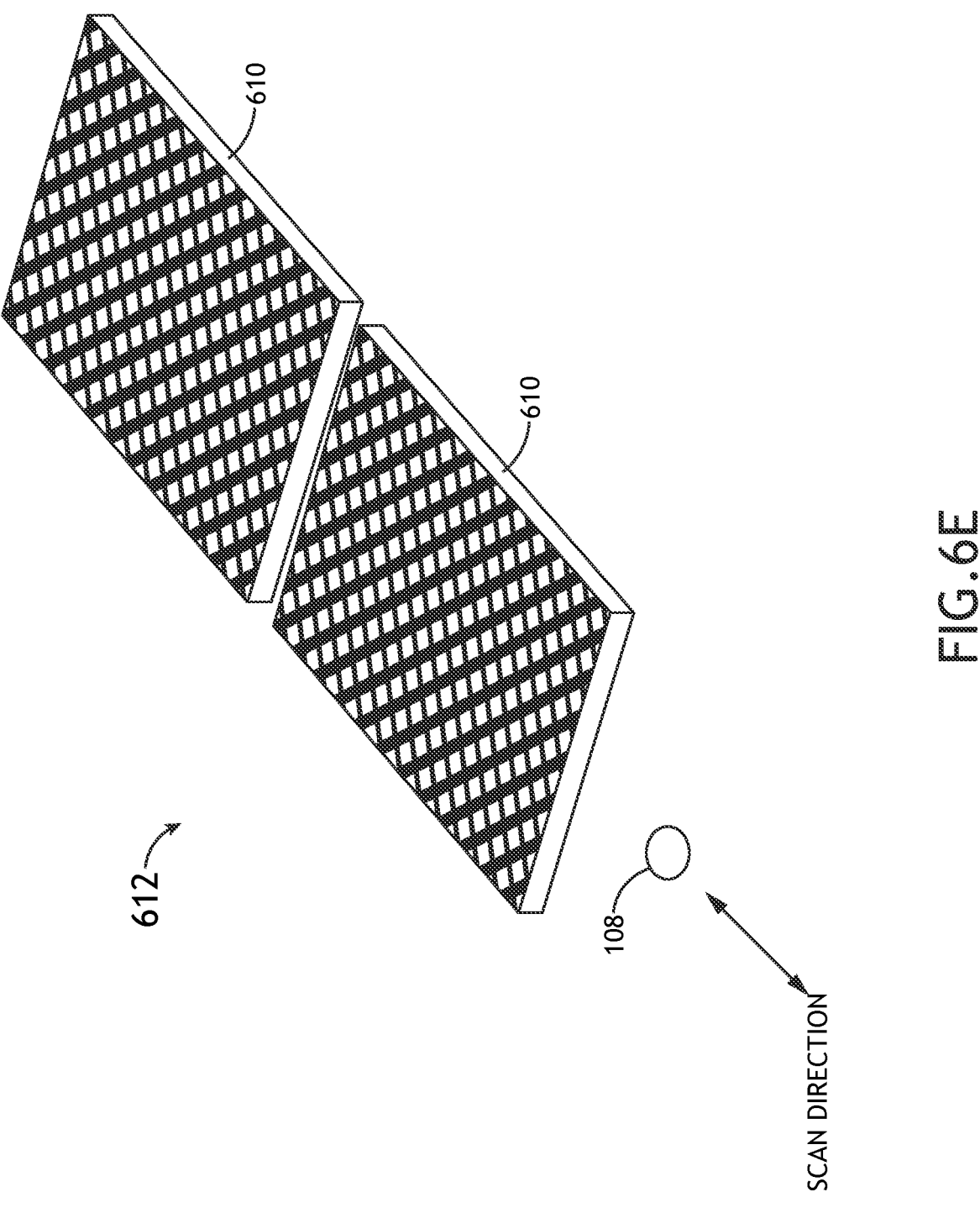

FIG. 6E is a schematic view of an overlay target, in accordance with one or more embodiments of the present disclosure.

FIG. 7 is a process flow diagram depicting a method for overlay metrology using two or more cells, in accordance with one or more embodiments of the present disclosure.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Overlay metrology may be performed using a variety of overlay metrology techniques. For example, techniques include static move-and-measure modes where the sample is static during measurement and scanning modes where an illumination beam is scanned across the sample during measurement. Scanning-based scatterometry measurement techniques include fast detectors to capture time-varying interference signals generated as the sample is scanned. The detectors may be placed in the pupil plane at locations of overlap between selected diffraction orders to capture time-varying interference signals as the sample is scanned. Various non-limiting scanning scatterometry overlay metrology techniques are described in U.S. Patent Publication No. 2022/0034652 filed on Feb. 17, 2021; U.S. patent application Ser. No. 17/119,536 filed on Dec. 11, 2020, U.S. patent application Ser. No. 17/708,958 filed on Mar. 30, 2022; and U.S. patent application Ser. No. 17/709,104 filed on Mar. 30, 2022; which are all incorporated herein by reference in their entireties. Note that such scanning examples are nonlimiting and embodiments herein may include one or more detectors in a field plane and may include various types of detectors such as one or more diode array sensors.

Ideally, time-varying diffraction signals will follow a trivial mathematical equation, but practically speaking, the diffraction signals may include TIS error. TIS error may be caused by a variety of factors. For example, TIS error may be caused by inhomogeneity of the illumination beam, errors in scanning speed during scanning overlay metrology, and/or errors in alignment of the illumination beam with the sample. Inhomogeneity of the illumination beam may be caused by contaminates on components (e.g., filters, lenses) of an illumination sub-system of the overlay metrology system. TIS may also be caused by other factors, such as a misalignment of the illumination beam relative to the sample. For diffraction signals of a single cell, TIS error may be difficult to determine using scanning modes.

Embodiments of the present disclosure are directed to using an overlay metrology system to generate an overlay measurement of an overlay target with suppressed TIS error. It is contemplated herein that TIS errors are correlated with the order of gratings of a cell—such that reversing the order of the gratings creates an opposite amount of TIS error. In embodiments, using this principle, the TIS error may be "cancelled out" by averaging the overlay of cells having opposite (i.e., reversed) orders of gratings. For instance, the overlay target may include a first cell and a second cell. Structures (e.g., gratings) of the cells may be distributed in different layers of the sample, such that the structures overlap each other in each cell. The first cell may include structures with a first pitch in a first layer and structures with a second pitch in a second layer. The second cell may also include the same pitches, but in a reversed order. Since the TIS error of such cells will be of opposite magnitude, the overlay measurements of each cell may be averaged to generate an overlay measurement with suppressed TIS error.

FIG. 1A illustrates a conceptual view of an overlay metrology system 100, in accordance with one or more embodiments of the present disclosure.

The overlay metrology system 100 includes an optical sub-system 102 configured to acquire one or more images from a sample 104 for use in determining overlay measurements.

In embodiments, overlay metrology system 100 includes a controller 122. The controller 122 may include one or more processors 124 and memory 126. For example, the controller 122 may be configured to generate an overlay measurement based on signals received from a detector of the optical sub-system 102

FIG. 1B illustrates a simplified schematic view of the optical sub-system 102, in accordance with one or more embodiments of the present disclosure.

In embodiments, optical sub-system 102 includes an illumination sub-system 106 and a collection sub-system 110.

The illumination sub-system 106 is configured to generate illumination in the form of one or more illumination beams 108 to illuminate the sample 104. The collection sub-system 110 is configured to collect light from the illuminated sample 104 (e.g., according to a metrology recipe). Further, the one or more illumination beams 108 may be spatially limited such that they may illuminate selected portions of the sample 104. For instance, each of the one or more illumination beams 108 may be spatially limited to illuminate a particular cell of an overlay target.

For example, overlay metrology system 100 may be configured to image certain types of samples, according to a metrology recipe. For instance, the overlay metrology system 100 may be designed (configured) and/or programmed (e.g., programmed via program instructions) to calculate overlay measurements of certain types of features of a sample 104 (e.g., grating-over-grating target) according to a metrology recipe.

As noted previously herein, the overlay metrology system 100 may include one or more detectors 112. Depending on the embodiment, unless noted otherwise, the one or more detectors 112 may be used for scanning overlay metrology, static overlay metrology, or both and with imaging and/or scatterometry techniques. In embodiments for scanning overlay metrology, the one or more detectors 112 may generally include any type of optical detector known in the art suitable for capturing interference signals generated as the sample 104 is translated by a translation stage 116 and/or as one or more illumination beams 108 are scanned by the optical sub-system 102. For example, the one or more detectors 112 may be diode array sensors and/or charge-coupled device (CCD) sensors.

In embodiments for scanning overlay metrology, as an example, the one or more detectors 112 are located in a collection pupil plane 114 as shown in FIG. 1B. By way of another example, the one or more detectors 112 are located in a collection field plane 150. In such an example, the one or more detectors 112 may be able to image the entire field plane of an entire overlay target. The field plane is conjugate to the object plane such that the sample 104 may be imaged from a top down view.

In embodiments, the optical sub-system 102 may include a translation stage 116 to scan the sample 104 through a measurement field of view of the optical sub-system 102 during an overlay measurement.

For example, performing scanning-based overlay metrology may include receiving detection signals from one or more detectors 112 while the sample 104 is in motion such that the detection signals are time-varying interference signals.

For static overlay metrology, in embodiments, the one or more detectors include a multi-pixel sensor. For example, the multi-pixel sensor may be at least one of a (multi-pixel) charge-coupled device (CCD) or a complementary metal-oxide-semiconductor (CMOS) device. For instance, the multi-pixel sensor may be a charge-coupled device (CCD) in one embodiment and a complementary metal-oxide-semiconductor (CMOS) device in another embodiment.

In embodiments, the optical sub-system 102 may perform scatterometry overlay measurements on portions of the sample 104 having overlay targets such as, but not limited to, grating-over-grating targets.

In embodiments, the structures of a cell may be configured to produce Moiré diffraction orders (e.g., +1 Moiré order diffraction and −1 Moiré order diffraction).

It is recognized herein that the distribution of diffraction orders of an illumination beam 108 created by periodic structures (e.g., grating-over-grating structures) may be influenced by a variety of parameters such as, but not limited to, a wavelength of the illumination beam 108, an incidence angle of the illumination beam 108 in both altitude and azimuth directions, a period (i.e., pitch) of the periodic structures, or a numerical aperture (NA) of a collection lens. Accordingly, the illumination sub-system 106, the collection sub-system 110, and the overlay target 302 may be configured to provide an overlapping distribution of zero-order diffraction and first-order diffraction in the collection pupil plane 114 of the collection sub-system 110. For example, the illumination sub-system 106 and/or the collection sub-system 110 may be configured to generate measurements on grating-over-grating structures having a selected range of periodicities that provide the overlapping distribution. Further, various components of the illumination sub-system 106 and/or the collection sub-system 110 (e.g., stops, pupils, or the like) may be adjustable to provide the overlapping distribution for a given structure.

The collection sub-system 110 may be configured to collect at least one of 0-order diffraction (e.g., specular reflection) and +/−1 diffraction orders from the sample 104 associated with diffraction of the illumination beam 108.

In embodiments, the optical sub-system 102 includes an objective lens 136 to focus the illumination beam 108 onto the sample 104 (e.g., onto an overlay target with structures located on two or more layers of the sample 104). The objective lens 136 may be configured to collect measurement light emanating from a sample 104 in response to the illumination beam 108 as the sample 104 is scanned along a scan direction.

The optical sub-system may implement a variety of illumination beam distributions. For example, the illumination beam 108 may be circular, annular, and/or the like.

FIG. 2A illustrates a conceptual view of an illumination pupil plane distribution 200 of a circular illumination beam 204, in accordance with one or more embodiments of the present disclosure.

FIG. 2B illustrates a conceptual view of a collection pupil plane distribution 202 of diffraction orders of the circular illumination beam 204 of FIG. 2A, in accordance with one or more embodiments of the present disclosure. For example, a circular illumination beam 204 may—after emanating from the sample 104—become a measurement beam and form circular diffraction orders in a collection pupil plane 114. Circular diffraction orders are illustrated by zero order (0) circular diffraction order 206a, first order (+1) circular diffraction order 206c, and first order (−1) circular diffraction order 206b. The one or more detectors 112 may be placed to capture the overlapping regions 208a, 208b of such diffraction orders. For example, detectors 112 (e.g., diode array sensors) may be placed in the pupil plane 114 such that the one or more detectors 112 generally capture light from detected regions 210c, 210b. Note that the detected regions 210c, 210b may be any size, such as smaller, equal, or larger than the overlapping regions 208a, 208b.

FIG. 3 illustrates a schematic view of an overlay target 302 of a sample 104, in accordance with one or more embodiments of the present disclosure. The illumination beam 108 is scanned along a scan direction 318. Scanning the overlay target 302 by a length equal to a pitch of a grating-over-grating structure may result in a phase shift of $2\pi$ in each of the +/−1 diffraction orders (in opposite directions) and the intensity captured by each of the one or more detectors 112 may oscillate through an interference fringe.

As shown, the illumination beam 108 may occupy a field of view that is smaller than the overlay target 302 itself. It is to be understood, however, that the overlay target 302 in FIG. 3 and the associated descriptions are provided solely for illustrative purposes and should not be interpreted as limiting. For instance, an overlay target may include cells configured to be scanned along more than one scan direction. For instance, an overlay target may include a first cell grouping having periodicities along the X direction and a second cell grouping having periodicities along the Y direction. In this way, all cells within a particular cell grouping may be imaged/detected at the same time while the sample 104 is scanned along a corresponding scan direction associated with that grouping. By way of another example, diagonal targets suitable for metrology measurements in orthogonal directions in a single scan are described generally in U.S. Patent Publication No. 2021/0364935 published on Nov. 25, 2021, which is incorporated herein by reference in its entirety.

For purposes of the present disclosure, some concepts may be better understood in reference to a cell "type", rather than explaining the limitations of each cell in detail repeatedly. For example, a first cell type and a second cell type are defined such that the second cell type has structures with pitches in the opposite order than the first cell type. Note that the first cell type may be referred to as a "P/Q" cell and the second cell type may be referred to as a "Q/P" cell. For instance, the first pitch may be "P" and the second pitch may be "Q." This concept may also be described in reference to "first" and "second" pitches. In embodiments, the first cell type is characterized by an order of structures in layers, the order characterized by pitches of the structures in the layers. The second cell type is characterized by a second order of second structures in the layers of the sample, the second order characterized by second pitches of the second structures in the layers. The pitches of the first cell type and the second pitches of the second cell type both include structures with a first pitch and structures with a second pitch, but wherein the first pitch and the second pitch of the first cell type are in a reversed order relative to the structures with the first pitch and the second pitch in the second cell type. This order may be defined relative to a depth direction of the sample. For example, an upper layer of the sample may be "above", in relative terms, a lower layer. In this regard, grating structures with the first pitch may be above or below grating structures with the second pitch and in a reversed order in one cell type compared to the other cell type.

Referring again to FIG. 3, unless otherwise noted, a first cell 304 is of the first cell type and a second cell 306 is of the second cell type.

In embodiments, the overlay target 302 includes a first cell 304 and a second cell 306. The first cell 304 includes a first layer with structures 310 having a first pitch and a second layer with structures 308 having a second pitch. Structures 310 are on top of structures 308, relative to a depth direction of the sample 104. In embodiments, layers of the second cell 306 include structures 312 having the first pitch and structures 314 having the second pitch in a reversed order. Note that the order is not necessarily limited to the example shown in FIG. 3. For instance, the first cell 304 and the second cell 306 may include any number of layers, such as any number of intermediate layers between the structures 308, 310, 312, 314.

By way of another example, the cells 304, 306 may include three or more layers (e.g., four or more, five or more, six or more, or the like) of varying pitches, so that the overlay between many layers can be measured. For instance, the second cell may include all three layers in the reversed order (e.g., pitches 3, 2, 1, rather than pitches 1, 2, 3).

Note, however, that the three or more pitches can, alternatively, be in different layers, such that no cell has more than two pitches. For example, the methods herein (e.g., using two cells, one with reversed order of pitches) can be applied to three or more pitches as follows: two cells of pitches in the first and second layers of a sample (but in reversed order); two additional cells with pitches in the first and third layers; and two final cells with pitches in the second and third layers. In this regard, the overlay between all three layers may be determined.

FIG. 4 illustrates a top view of an overlay target 400, in accordance with one or more embodiments of the present disclosure. FIG. 4 may illustrate cells 304, 306 in a side-by-side (i.e., parallel) configuration, rather than a sequential configuration. Note that the illumination beam 108 may need to be scanned across the overlay target 400 twice, such as in a "c" shape. For instance, after scanning the first cell 304, the illumination beam may be moved down and then scanned across the second cell 306. In other embodiments, two illumination beams 108 are used to simultaneously scan two parallel cells.

FIG. 5 illustrates a data graph 500 depicting TIS error for various wavelengths for single cell targets and multi-cell reversed pitch targets, in accordance with one or more embodiments of the present disclosure.

As shown, the TIS error increases as the wavelength increases from 500 nm to 580 nm. Using embodiments of the present disclosure, the TIS error may be suppressed by more than 70%, but is not limited to such suppression levels. As shown, the multi-cell TIS error 504 allowed by the present disclosure is significantly lower than the single cell TIS error 502 of other methods (e.g., methods not necessarily based on the present disclosure).

The following formulas relate to an overlay target with two or more layers, such as the overlay target 302 of FIG. 3. The following formulas may be similar, except for additional TIS error terms, compared to the formulas shown in U.S. patent application Ser. No. 17/709,200, filed Mar. 30, 2022, which is hereby incorporated by reference in its entirety. However, the following formulas are indicative of how an equal ratio of first cell types to second cell types allow for cancelling out the TIS error terms.

Cancelling out the TIS error may be better understood by initially understanding the TIS error term in reference to a single cell (e.g., the first cell 304 of FIG. 3) before understanding the second cell. For purposes of the following formulas, the first cell 304 has a first (top) layer with structures 310 with a first pitch (p1) and a second (lower) layer with structures 308 with a second pitch (p2).

The interference intensity can be modeled as a function of the grating position (X)*2*pi/Pitch. The interference intensity measured by a detector in the overlap between a zero and first-order diffraction (e.g., corresponding to a time-varying signal) from structure 310 with the first pitch (P1) is:

$$I_{P1\pm} =$$

$$(E0 + E1)^2 = (E0)^2 + (E1)^2 + 2E0E1 = DC + 2A_1 A_0 \cos\left[\frac{2\pi}{P_1}(X - X_0) \pm \varphi\right]$$

The interference intensity measured in the overlap between zero and first-order diffraction from structure 308 with the second pitch (P2) is:

$$I_{P2\pm} = (E0 + E1)^2 =$$

$$(E0)^2 + (E1)^2 + 2E0E1 = DC + 2A_1' A_0' \cos\left[\frac{2\pi}{P_2}(X - X_0 + OVL) \pm \theta\right]$$

where $P_1$ is the first pitch of elements in the first layer; $P_2$ is the second pitch of elements in the second layer; $A_0$, $A_1$, correspond to strengths of the zero and first diffraction orders, respectively, associated with pitch $P_1$; $A_0'$, $A_1'$ correspond to strengths of the zero and second diffraction orders, respectively, associated with second pitch $P_2$; $\varphi$ is a phase term associated with the $I_{P1\pm}$ signal; $\theta$ is a phase term associated with the $I_{P2\pm}$ signal; X is an X-direction variable (i.e., scanning position at a given point in time); $X_0$ is a position in the X-direction at time 0 (i.e., starting position); and DC is a constant offset analogous to using direct, rather than alternating, current.

The overlay, generally, for the first cell 304 is:

$$OVL = \frac{1}{4\pi}(P_1(\Phi_{1,1} + \Phi_{1,-1}) - P_2(\Phi_{2,1} + \Phi_{2,-1}))$$

Unfortunately, if the illumination is not perfectly homogeneous another term, $\rho$—which is associated with TIS error—is added to the interference equations:

$$I_{P1\pm} = DC + 2A_1 A_0 \cos\left[\frac{2\pi}{P_1}(X - X_0) \pm \varphi + \rho_1/2\right]$$

$$I_{P2\pm} = DC + 2A_1' A_0' \cos\left[\frac{2\pi}{P_2}(X - X_0 + OVL) \pm \theta + \rho_2/2\right]$$

This additional phase ($\rho_1$ and $\rho_2$) is eventually adding a constant value to the resulting OVL over time, otherwise known as TIS error:

$$OVL(\text{measured}) =$$
$$\frac{1}{4\pi}(P_2(\Phi_{1,1} + \Phi_{1,-1}) - P_1(\Phi_{2,1} + \Phi_{2,-1}) + (\rho_2 * P_2 - \rho_1 * P_1))$$

The above equation is for a first cell 304, which may be called a "P/Q" cell. To overcome the TIS error, we may reverse the order of the pitches of the structures of the first cell 304 to create a second cell 306. The second cell 306 is a second type of cell, which may be called a "Q/P" cell.

The resulting equations of overlay for such cells are:

$$OVL(P/Q) = \frac{1}{4\pi}(P_2(\Phi_{1,1} + \Phi_{1,-1}) - P_1(\Phi_{2,1} + \Phi_{2,-1}) + (\rho_2 * P_2 - \rho_1 * P_1))$$

$$OVL(Q/P) = \frac{1}{4\pi}(P_1(\Phi_{1,1} + \Phi_{1,-1}) - P_2(\Phi_{2,1} + \Phi_{2,-1}) + (\rho_1 * P_1 - \rho_2 * P_2))$$

Thus, by averaging both results we are able to esiminate TIS error caused by illumination contamination:

$$OVL \text{ (with } TIS \text{ suppressed)} = \frac{OVL\left(\frac{P}{Q}\right) + OVL\left(\frac{Q}{P}\right)}{2}$$

FIGS. 6A-6E illustrate top views of overlay targets, in accordance with one or more embodiments of the present disclosure.

FIG. 6A illustrates a top view of a knight overlay target 602, in accordance with one or more embodiments of the present disclosure.

In embodiments, the two or more cells include at least three cells sequentially (i.e., X1, X2, and Y1) and a fourth cell (i.e., Y2) adjacent to the third cell (i.e., Y1) of the at least three cells. A first cell (X1) and second cell (X2) of the at least three cells are configured to be used with the scan direction (e.g., the X scan direction), while the fourth cell and the third cell are configured to be used with a different scan direction (e.g., the Y scan direction).

FIG. 6B illustrates a top view of a denim overlay target 604, in accordance with one or more embodiments of the present disclosure.

Note that periodicity along the scan direction may include periodicity at non-zero angles relative to the scan direction.

A potential issue of the denim target 604 shown in FIG. 6B is TIS error. Therefore, for pitches that are angled (e.g., 45 degrees) relative to the scan direction, four cells (FIG. 6C) may be more desirable to reduce the number of scans and still get overlay in two directions (e.g., an X-direction overlay and a Y-direction overlay) that also have reduced TIS error in a single scan.

FIG. 6C illustrates a top view of a bishop overlay target 606, in accordance with one or more embodiments of the present disclosure. In embodiments, the two or more cells include four cells 304, 614, 306, 616 aligned in a row. The four cells include a first cell 304 (of a first cell type) and a corresponding third cell 305 (of a second cell type). The first cell 304 and third cell 306 both include periodic structures at plus 45 degrees from a scan direction. Note that in this example, the second cell 614 does not correspond to the first cell 304 like in other examples of this disclosure, rather, it corresponds to the fourth cell 616. The second cell 614 and corresponding fourth cell 616 may include periodic structures at minus 45 degrees and include pitches in reversed order relative to each other. The second cell 614 and corresponding fourth cell 616 may correspond to diffraction orders indicative of overlay in the X-direction (horizontal in FIG. 6C)—while the first cell 304 and corresponding third cell 306 may correspond to diffraction orders indicative of overlay in the Y-direction (vertical in FIG. 6C). In this regard, the overlay target of FIG. 6C may allow for a "single" scan for generating overlay in both the X-direction and the Y-direction.

FIG. 6D illustrates a schematic view of a waffle overlay target 608, in accordance with one or more embodiments of the present disclosure.

In embodiments, the two or more cells of the overlay target include waffle cells 610 with periodic structures in the same layer at plus 45 degrees and minus 45 degrees from the scan direction such that a waffle pattern is formed.

FIG. 6E illustrates a schematic view of a waffle overlay target 612, in accordance with one or more embodiments of the present disclosure. In embodiments, two waffle cells 610 may be placed sequentially and/or in parallel.

In embodiments, a scan may be performed 1) by adjusting optics (e.g., objective lens 136, or any other optics) of the optical sub-system 102; and/or 2) by moving the sample 104 via the translation stage 116. Note that adjusting the illumination beam 108 to scan the sample 104 may result in TIS error because doing so may result in errors in the vertical alignment of the illumination beam 108 with the sample 104 due to imperfect beam translation. The amount of TIS error may vary as a function of the amount of beam translation performed. In embodiments, this TIS error may be addressed by using more than one pair of cells (e.g., a first cell type 304 and corresponding second cell type 306) to address differences in the illumination beam 108 alignment. For example, an overlay target for use with an illumination beam 108 that is translated using optics, may include multiple pairs of cells 304, 306 aligned in a row.

FIG. 7 illustrates a process flow diagram of a method 700 for overlay metrology using two or more cells, in accordance with one or more embodiments of the present disclosure. It is noted that the embodiments and enabling technologies described previously herein in the context of the overlay metrology system 100 should be interpreted to extend to the method 700. It is further noted herein that the steps of method 700 may be implemented all or in part by overlay metrology system 100. It is further recognized, however, that the method 700 is not limited to the overlay metrology system 100 in that additional or alternative system-level embodiments may carry out all or part of the steps of method 700.

At step 702, first detection signals are received from the one or more detectors 112 from a first cell 304. For example, the first detection signals may be signals generated by one or more detectors 112. For instance, one detector 112 may be located in each overlapping region 208a, 208b shown in FIG. 2B as a first cell 304 is scanned. For example, a controller 122 may be configured to receive such first detection signals (e.g., as data to be stored on memory).

At step 704, second detection signals are received from the one or more detectors 112 during a scan of a second cell 306.

At step 706, an overlay measurement associated with the overlay target 302 is generated based on a value indicative of an average of an overlay measurement of the first cell 304 and an overlay measurement of the second cell 306. For example, the first cell 304 may be of the first cell type described previously and the second cell 306 may be of the second cell type (i.e., having reversed pitch order) described previously. In this regard, by averaging the results, the overlay may have reduced TIS error.

At an optional step, a tool induced shift (TIS) error of the overlay target 302 is determined based on a difference between the overlay measurement of the first cell and the overlay measurement of the second cell. The TIS error may be a function of half of the absolute value of the second overlay measurement subtracted from the overlay measurement of the first cell.

At an optional step, at least one of intensity or phase information associated with the time-varying interference signals is extracted using a phase locking technique; and the overlay error between the first and second layers of the sample is determined based on the at least one of intensity or phase information. For example, generating the overlay measurement associated with the overlay target may include such optional steps. Such optional steps are described in additional detail in one or more of the references previously incorporated by reference herein.

Referring again to FIGS. 1A-1B, additional components of the optical sub-system 102 are described in accordance with one or more embodiments of the present disclosure. For example, controller 122 and processors 124 and various optical components are described below in detail for overlay metrology generally (i.e., not specifically for scanning or static overlay metrology, unless otherwise noted).

In embodiments, the controller 122 generates (or determines) an overlay measurement between layers of an overlay target 302 (e.g., the first layer and the second layer) along the measurement direction based on the comparison of the detection signals. For example, the controller 122 may compare the magnitudes and/or phases of the detection signals to generate an overlay measurement. For instance, U.S. Pat. No. 10,824,079 issued on Nov. 3, 2020 incorporated herein by reference in its entirety generally describes diffracted orders in a collection pupil and further provides specific relationships between overlay and measured intensity in the pupil plane. It is contemplated herein that the systems and methods disclosed herein may extend the teachings of U.S. Pat. No. 10,824,079 to detection signals captured by one or more detectors placed in overlap regions between 0 and +/−1 diffraction orders. In particular, it is contemplated herein that overlay on a sample may be proportional to a relative phase shift between two detection signals. In another instance, the relative intensities of the diffraction orders in the pupil plane may be extracted from the detection signals. In this way, any overlay algorithm based on relative intensity differences of diffraction orders known in the art may be applied to generate an overlay measurement.

In embodiments, the overlay metrology system 100 includes a controller 122 communicatively coupled to the optical sub-system 102. The controller 122 may include one or more processors 124 and a memory device 126, or memory. For example, the one or more processors 124 may be configured to execute a set of program instructions maintained in the memory device 126.

The one or more processors 124 of the controller 122 may generally include any processor or processing element known in the art. For the purposes of the present disclosure, the term "processor" or "processing element" may be broadly defined to encompass any device having one or more processing or logic elements (e.g., one or more microprocessor devices, one or more application specific integrated circuit (ASIC) devices, one or more field programmable gate arrays (FPGAs), or one or more digital signal processors (DSPs)). In this sense, the one or more processors 124 may include any device configured to execute algorithms and/or instructions (e.g., program instructions stored in memory). In one embodiment, the one or more processors 124 may be embodied as a desktop computer, mainframe computer system, workstation, image computer, parallel processor, networked computer, or any other computer system configured to execute a program configured to operate or operate in conjunction with the overlay metrology system 100, as described throughout the present disclosure. Moreover, different subsystems of the overlay metrology system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 122 may include one or more controllers housed in a common housing or within multiple housings. In this way, any controller or combination of controllers may be separately packaged as a module suitable for integration into system 100. Further, the controller 122 may analyze or otherwise process data received from the one or more detectors 112 and feed the data to additional components within the overlay metrology system 100 or external to the overlay metrology system 100.

Further, the memory device 126 may include any storage medium known in the art suitable for storing program instructions executable by the associated one or more processors 124. For example, the memory device 126 may include a non-transitory memory medium. As an additional example, the memory device 126 may include, but is not limited to, a read-only memory, a random-access memory, a magnetic or optical memory device (e.g., disk), a magnetic tape, a solid-state drive and the like. It is further noted that memory device 126 may be housed in a common controller housing with the one or more processors 124.

In this regard, the controller 122 may execute any of various processing steps associated with overlay metrology. For example, the controller 122 may be configured to generate control signals to direct or otherwise control the optical sub-system 102, or any components thereof. For instance, the controller 122 may be configured to direct the translation stage 116 to translate the sample 104 along one or more measurement paths, or swaths, to scan one or more overlay targets through a measurement field of view of the optical sub-system 102. By way of another example, the controller 122 may be configured to receive signals corresponding to the detection signals from the one or more detectors 112. By way of another example, the controller 122 may generate correctables for one or more additional fabrication tools as feedback and/or feed-forward control of the one or more additional fabrication tools based on overlay measurements from the optical sub-system 102.

In embodiments, the controller 122 captures the detection signals detected by the one or more detectors 112. The controller 122 may generally capture data such as, but not limited to, the magnitudes or the phases of the detection signals using any technique known in the art such as, but not limited to, one or more phase-locked loops. Further, the controller 122 may capture the detection signals (e.g., detection signals), or any data associated with the detection signals, using any combination of hardware (e.g., circuitry) or software techniques.

Referring again to FIG. 1B, various components of the optical sub-system 102 are described in greater detail in accordance with one or more embodiments of the present disclosure.

In embodiments, the illumination sub-system 106 includes an illumination source 128 configured to generate at least one illumination beam 108. The illumination from the illumination source 128 may include one or more selected wavelengths of light including, but not limited to, ultraviolet (UV) radiation, visible radiation, or infrared (IR) radiation.

In embodiments, the illumination sub-system 106 includes one or more optical components suitable for modifying and/or conditioning the illumination beam 108 as well as directing the illumination beam 108 to the sample 104. For example, the illumination sub-system 106 may include one or more illumination lenses 130 (e.g., to collimate the illumination beam 108, to relay an illumination pupil plane 120 and/or an illumination field plane 132, or the like). In another embodiment, the illumination sub-system 106 includes one or more illumination control optics 134 to shape or otherwise control the illumination beam 108. For example, the illumination control optics 134 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

In embodiments, the illumination sub-system 106 illuminates the sample 104 with two or more illumination beams 108. Further, the two or more illumination beams 108 may be, but are not required to be, incident on different portions of the sample 104 (e.g., different cells of an overlay target 302) within a measurement field of view (e.g., a field of view of the objective lens 136). It is contemplated herein that the two or more illumination beams 108 may be generated using a variety of techniques. In one embodiment, the illumination sub-system 106 includes two or more apertures at an illumination field plane 132. In another embodiment, the illumination sub-system 106 includes one or more beamsplitters to split illumination from the illumination source 128 into the two or more illumination beams 108. In another embodiment, at least one illumination source 128 generates two or more illumination beams 108 directly. In a general sense, each illumination beam 108 may be considered to be a part of a different illumination channel regardless of the technique in which the various illumination beams 108 are generated.

The collection sub-system 110 may include one or more optical elements suitable for modifying and/or conditioning the collected light 138 from the sample 104. In one embodiment, the collection sub-system 110 includes one or more collection lenses 140 (e.g., to collimate the illumination beam 108, to relay pupil and/or field planes, or the like), which may include, but are not required to include, the objective lens 136. In another embodiment, the collection sub-system 110 includes one or more collection control optics 142 to shape or otherwise control the collected light 138. For example, the collection control optics 142 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like). In another example, the collection sub-system 110 may include one or more collection field planes 150.

In embodiments, the collection sub-system 110 includes two or more collection channels 144, each with a separate detector 112 (or multiple detectors 112). For example, the optical sub-system 102 may include one or more beamsplitters 146 arranged to split the collected light 138 into the collection channels 144. Further, the beamsplitters 146 may be polarizing beamsplitters, non-polarizing beamsplitters, or a combination thereof.

In embodiments, multiple collection channels 144 are configured to collect light from multiple illumination beams 108 on the sample 104. For example, in the case that an overlay target 302 has two or more cells in parallel—distributed in a direction different than a scan direction—the optical sub-system 102 may simultaneously illuminate the different cells with different illumination beams 108 and simultaneously capture detection signals associated with each illumination beam 108. Additionally, in some embodiments, multiple illumination beams 108 directed to the sample 104 may have different polarizations. In this way, the diffraction orders associated with each of the illumination beams 108 may be separated. For example, polarizing beam splitters 146 may efficiently separate the diffraction orders associated with the different illumination beams 108. By way of another example, polarizers may be used in one or more collection channels 144 to isolate desired diffraction orders for measurement.

Referring again to FIG. 1A, it is noted herein that the one or more components of overlay metrology system 100 may be communicatively coupled to the various other components of system 100 in any manner known in the art. For example, the one or more processors 124 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 122 may be communicatively coupled to one or more components of optical sub-system 102 via any wireline or wireless connection known in the art.

In one embodiment, the one or more processors 124 may include any one or more processing elements known in the art. In this sense, the one or more processors 124 may include any microprocessor-type device configured to execute software algorithms and/or instructions. In one embodiment, the one or more processors 124 may consist of a desktop computer, mainframe computer system, worksta- tion, image computer, parallel processor, or other computer system (e.g., networked computer) configured to execute a program configured to operate the overlay metrology system 100, as described throughout the present disclosure. It should be recognized that the steps described throughout the present disclosure may be carried out by a single computer system or, alternatively, multiple computer systems. Fur- thermore, it should be recognized that the steps described throughout the present disclosure may be carried out on any one or more of the one or more processors 124. In general, the term "processor" may be broadly defined to encompass any device having one or more processing elements, which execute program instructions from memory 126. Moreover, different subsystems of the overlay metrology system 100 may include processor or logic elements suitable for carry- ing out at least a portion of the steps described throughout the present disclosure. Therefore, the above description should not be interpreted as a limitation on the present disclosure but merely an illustration.

One skilled in the art will recognize that the herein described components (e.g., operations), devices, objects, and the discussion accompanying them are used as examples for the sake of conceptual clarity and that various configu- ration modifications are contemplated. Consequently, as used herein, the specific exemplars set forth and the accom- panying discussion are intended to be representative of their more general classes. In general, use of any specific exem- plar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effec- tively "associated" such that the desired functionality is achieved. Hence, any two components herein combined to achieve a particular functionality can be seen as "associated with" each other such that the desired functionality is achieved, irrespective of architectures or intermedial com- ponents. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly inter- actable and/or wirelessly interacting components and/or logically interacting and/or logically interactable compo- nents.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "includ- ing but not limited to," the term "having" should be inter- preted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

We claim:

1. An overlay metrology system comprising:
a controller comprising one or more processors configured to execute program instructions causing the one or more processors to execute a metrology recipe by:
receiving first detection signals from one or more detectors from a first cell of two or more cells of an overlay target;
receiving second detection signals from the one or more detectors from a second cell of the two or more cells;
generating an overlay measurement of the first cell based on the first detection signals;
generating an overlay measurement of the second cell based on the second detection signals;

generating an overlay measurement associated with the overlay target based on a value indicative of an average of the overlay measurement of the first cell and the overlay measurement of the second cell,
wherein the first cell is defined as a first cell type characterized by an order of structures in layers, the order characterized by pitches of the structures in the layers, wherein the second cell is defined as a second cell type characterized by a second order of second structures in the layers, the second order characterized by second pitches of the second structures in the layers,
wherein the first cell includes a first layer of structures having a first pitch and a second layer having a second pitch, wherein the second cell includes a first layer of structures having the second pitch and a second layer having the first pitch such that the pitches of structures within layers of the second cell are reversed relative to the first cell, wherein the order of structures in layers of the first cell type and second cell type are configured to suppress tool induced shift (TIS) error by averaging overlay measurements of cells with reversed pitch orders,
wherein the receiving the first detection signals and the receiving the second detection signals comprises receiving time-varying interference signals as the overlay target is scanned while the overlay target is in motion;
extracting at least one of intensity or phase information associated with the received time-varying interference signals using a phase locking technique; and
determining an overlay error between the first and second layers of the overlay target based on at least one of intensity or phase information.

2. The overlay metrology system of claim 1, wherein the controller is configured to execute the program instructions causing the one or more processors to execute the metrology recipe by: determining a tool induced shift (TIS) error of the overlay target based on a difference between the overlay measurement of the first cell and the overlay measurement of the second cell.

3. The overlay metrology system of claim 1, wherein the one or more detectors comprise at least one detector located in a pupil plane.

4. The overlay metrology system of claim 1, wherein the one or more detectors comprise at least one detector located in a field plane.

5. The overlay metrology system of claim 1, wherein the one or more detectors comprise at least one diode array sensor.

6. The overlay metrology system of claim 1, wherein the one or more detectors comprise at least one charge-coupled device (CCD) sensor.

7. The overlay metrology system of claim 1, wherein an illumination pupil plane distribution of an illumination beam is circular.

8. The overlay metrology system of claim 1, wherein an illumination pupil plane distribution of an illumination beam is annular.

9. The overlay metrology system of claim 1, wherein the structures of the two or more cells of the overlay target are at 45 degree angles relative to a scan direction.

10. The overlay metrology system of claim 9, wherein the two or more cells of the overlay target comprise waffle cells with periodic structures in a same layer at plus 45 degrees and minus 45 degrees from the scan direction such that a waffle pattern is formed.

11. The overlay metrology system of claim 9, wherein the two or more cells comprise four cells in a row, wherein the four cells in the row comprise two first cell types adjacent to each other with the structures at a positive diagonal angle relative to the scan direction and two second cell types adjacent to each other with the structures at a negative diagonal angle relative to the scan direction.

12. The overlay metrology system of claim 9, wherein the two or more cells comprise at least three cells in a row and a fourth cell adjacent to a third cell of the at least three cells, wherein a first and second cell of the at least three cells are configured to be used with the scan direction, while the fourth cell and the third cell are configured to be used with a different scan direction orthogonal to the scan direction.

13. The overlay metrology system of claim 1, wherein the two or more cells comprise three or more layers of varying pitches.

14. The overlay metrology system of claim 1, wherein a first location comprising a first detector comprises a location of +1 Moiré order diffraction, wherein a second location comprising a second detector comprises a location of −1 Moiré order diffraction.

15. An overlay metrology system comprising:
an illumination sub-system comprising:
an illumination source configured to generate an illumination beam;
a collection sub-system comprising:
one or more detectors; and
an objective lens configured to collect measurement light emanating from a sample in response to the illumination beam as the sample is scanned along a scan direction, wherein the sample comprises an overlay target according to a metrology recipe, wherein the overlay target comprises two or more cells comprising structures with periodicity along the scan direction; and
a controller communicatively coupled to the collection sub-system, the controller comprising one or more processors configured to execute program instructions causing the one or more processors to execute the metrology recipe by:
receiving first detection signals from the one or more detectors from a first cell of the two or more cells;
receiving second detection signals from the one or more detectors from a second cell of the two or more cells;
generating an overlay measurement of the first cell based on the first detection signals;
generating an overlay measurement of the second cell based on the second detection signals;
generating an overlay measurement associated with the overlay target based on a value indicative of an average of the overlay measurement of the first cell and the overlay measurement of the second cell,
wherein the first cell is defined as a first cell type characterized by an order of the structures in layers, the order characterized by pitches of the structures in the layers, wherein the second cell is defined as a second cell type characterized by a second order of second structures in the layers, the second order characterized by second pitches of the second structures in the layers, wherein the first cell includes a first layer of structures having a first pitch and a second layer having a second pitch, wherein the second cell includes a first layer of structures having the second pitch and a second layer having the first pitch such that the pitches of structures within layers of the second cell are reversed relative to the first cell, wherein the order of structures in layers of the first cell type and second cell type are configured to suppress tool induced shift (TIS) error by averaging overlay measurements of cells with reversed pitch orders,
wherein the receiving the first detection signals and the receiving the second detection signals comprises receiving time-varying interference signals as the overlay target is scanned while the overlay target is in motion;
extracting at least one of intensity or phase information associated with the received time-varying interference signals using a phase locking technique; and
determining an overlay error between the first and second layers of the overlay target based on at least one of intensity or phase information.

16. The overlay metrology system of claim 15, wherein the controller is configured to execute the program instructions causing the one or more processors to execute the metrology recipe by: determining a tool induced shift (TIS) error of the overlay target based on a difference between the overlay measurement of the first cell and the overlay measurement of the second cell.

17. The overlay metrology system of claim 15, wherein the one or more detectors comprise at least one detector located in a pupil plane.

18. The overlay metrology system of claim 15, wherein the one or more detectors comprise at least one detector located in a field plane.

19. The overlay metrology system of claim 15, wherein the one or more detectors comprise at least one diode array sensor.

20. The overlay metrology system of claim 15, wherein the one or more detectors comprise at least one charge-coupled device (CCD) sensor.

21. The overlay metrology system of claim 15, wherein an illumination pupil plane distribution of the illumination beam is circular.

22. The overlay metrology system of claim 15, wherein an illumination pupil plane distribution of the illumination beam is annular.

23. The overlay metrology system of claim 15, wherein the structures of the two or more cells of the overlay target are at 45 degree angles relative to the scan direction.

24. The overlay metrology system of claim 23, wherein the two or more cells of the overlay target comprise waffle cells with periodic structures in a same layer at plus 45 degrees and minus 45 degrees from the scan direction such that a waffle pattern is formed.

25. The overlay metrology system of claim 23, wherein the two or more cells comprise at least four cells in a row, wherein the at least four cells in the row comprise at least two first cell types adjacent to each other with the structures at a positive diagonal angle relative to the scan direction and at least two second cell types adjacent to each other with the structures at a negative diagonal angle relative to the scan direction.

26. The overlay metrology system of claim 23, wherein the two or more cells comprise at least three cells in a row and a fourth cell adjacent to a third cell of the at least three cells, wherein the first cell and the second cell of the at least three cells are configured to be used with the scan direction, while the fourth cell and the third cell are configured to be used with a different scan direction orthogonal to the scan direction.

27. The overlay metrology system of claim 15, wherein the two or more cells comprise three or more layers of varying pitches.

28. The overlay metrology system of claim 15, wherein a first location comprising a first detector comprises a location of +1 Moiré order diffraction, wherein a second location comprising a second detector comprises a location of −1 Moiré order diffraction.

29. An overlay target comprising:

four cells aligned in a row comprising:

a first cell and a third cell comprising periodic structures at plus 45 degrees from a scan direction; and a second cell and a fourth cell comprising periodic structures at minus 45 degrees from the scan direction, wherein the first cell and the second cell are of a first cell type, and the third cell and the fourth cell are of a second cell type, wherein the first cell type is characterized by an order of structures in layers, the order characterized by pitches of the structures in the layers, wherein the second cell type is characterized by a second order of second structures, the second order characterized by second pitches of the second structures in the layers, wherein the first cell includes a first layer of structures having a first pitch and a second layer having a second pitch, wherein the second cell includes a first layer of structures having the second pitch and a second layer having the first pitch such that the pitches of structures within layers of the second cell are reversed relative to the first cell, wherein the first cell type and second cell type are configured to suppress tool induced shift (TIS) error by averaging overlay measurements of cells with reversed pitch orders, wherein time-varying interference signals of the overlay target are obtained when the overlay target is in motion;

wherein at least one of intensity or phase information associated with the received time-varying interference signals is extracted from the overlay target using a phase locking technique; and wherein overlay error between layers of the overlay target is determined based on at least one of intensity or phase information.

30. A method comprising:

receiving first detection signals from one or more detectors from a first cell of two or more cells of an overlay target of a sample comprising structures with periodicity along a scan direction;

receiving second detection signals from the one or more detectors from a second cell of the two or more cells;

generating an overlay measurement of the first cell based on the first detection signals;

generating an overlay measurement of the second cell based on the second detection signals;

generating an overlay measurement associated with the overlay target based on a value indicative of an average of the overlay measurement of the first cell and the overlay measurement of the second cell, wherein the first cell is defined as a first cell type characterized by an order of the structures in layers, the order characterized by pitches of the structures in the layers, wherein the second cell is defined as a second cell type characterized by a second order of second structures in the layers, the second order characterized by second pitches of the second structures in the layers, wherein the first cell includes a first layer of structures having a first pitch and a second layer having a second pitch, wherein the second cell includes a first layer of structures having the second pitch and a second layer having the first pitch such that the pitches of structures within layers of the second cell are reversed relative to the first cell, wherein the order of structures in layers of the first cell type and second cell type are configured to suppress tool induced shift (TIS) error by averaging overlay measurements of cells with reversed pitch orders, wherein the receiving the first detection signals and the receiving the second detection signals comprises receiving time-varying interference signals as the overlay target is scanned while the overlay target is in motion;

extracting at least one of intensity or phase information associated with the received time-varying interference signals using a phase locking technique; and determining an overlay error between the first and second layers of the overlay target based on at least one of intensity or phase information.

31. The method of claim 30 further comprising:

determining a tool induced shift (TIS) error of the overlay target based on a difference between the overlay measurement of the first cell and the overlay measurement of the second cell.

* * * * *